United States Patent [19]

Heusler et al.

[11] 3,719,672

[45] March 6, 1973

[54] 4-SUBSTITUTED METHYLENE-7-AMINO-8-OXO-5-THIA-1-AZA-BICYCLO[4,2,0] OCT-2-ENE-2-CARBOXYLIC ACIDS

[75] Inventors: Karl Heusler, Basel, Switzerland; Robert Burns Woodward, Cambridge, Mass.; Ivan Ernest, Birsfelden, Switzerland

[73] Assignee: Ciba-Geigy Corporation, Ardsley, N.Y.

[22] Filed: Dec. 2, 1969

[21] Appl. No.: 881,639

[30] Foreign Application Priority Data

Dec. 11, 1968 Switzerland..........................18499/68
July 8, 1969 Switzerland..........................10372/69

[52] U.S. Cl................260/243 C, 424/246, 260/239
[51] Int. Cl. ............................................C07d 99/24

[58] Field of Search....................................260/243 C

[56] References Cited

UNITED STATES PATENTS

| | | | |
|---|---|---|---|
| 3,481,948 | 12/1969 | Woodward | 260/243 C |
| 3,483,216 | 12/1969 | Woodward | 260/243 C |
| 3,522,266 | 7/1970 | Woodward | 260/243 C |

*Primary Examiner*—Nicholas S. Rizzo
*Attorney*—Harry Goldsmith, Joseph G. Kolodny and Mario A. Monaco

[57] ABSTRACT

7-amino-4-methylene-8-oxo-5-thia-1-azabicyclo[4,2,0]oct-2-ene-2-carboxylic acid compounds, in which the 4-methylene group is substituted and the 7-amino group may be acylated exhibit antibacterial properties or may be used as intermediates for the manufacture of compounds having such properties.

25 Claims, No Drawings

4-SUBSTITUTED METHYLENE-7-AMINO-8-OXO-5-THIA-1-AZA-BICYCLO[4,2,0] OCT-2-ENE-2-CARBOXYLIC ACIDS

The subject of the present invention are thiazabicyclic compounds, especially 7-amino-8-oxo-5-thia-1-azabicyclo [4,2,0]oct-2-ene-2-carboxylic acid compounds of the formula

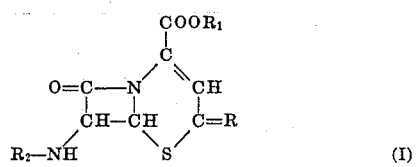

wherein $R_1$ represents a hydrogen atom or the organic residue of an alcohol, $R_2$ represents a hydrogen atom or the acyl residue Ac of an organic carboxylic acid, and R represents a methylene residue which is mono- or disubstituted by optionally substituted hydrocarbon residues, optionally substituted heterocyclic residues or optionally substituted heterocyclic-aliphatic residues, wherein heterocyclic groups possess aromatic character, or functional groups, as well as salts of such compounds having salt-forming groups.

The compounds of formula I possess the configuration of 7-amino-cephalosporanic acid; they may, therefore, also be designated as 7-amino-$\Delta^3$-cephem-4-carboxylic acid compounds.

Apart from hydrogen, the group $R_1$ can denote the organic residue of any alcohol, but especially an optionally substituted aliphatic or araliphatic hydrocarbon residue.

The group $R_2$ primarily represents the acyl residue Ac of an organic carboxylic acid, for example, of a carbonic acid semi-derivative or of an optionally substituted aliphatic, cycloaliphatic, cycloaliphatic-aliphatic, aromatic, araliphatic, heterocyclic or heterocyclic-aliphatic carboxylic acid.

A hydrocarbon residue substituting the methylene group R is primarily an optionally substituted aliphatic, cycloaliphatic, cycloaliphatic-aliphatic, aromatic or araliphatic hydrocarbon residue; such a hydrocarbon residue can also be bivalent in nature and may, for example, represent a bivalent aliphatic hydrocarbon residue. A functional substituent of the methylene group R is, for example, a free hydroxyl, as well as mercapto group, or hydroxyl, as well as mercapto group etherified, e.g., by an optionally substituted aliphatic, as well as aromatic or araliphatic hydrocarbon residue, or a hydroxyl, as well as mercapto group esterified, e.g. by an organic carboxylic acid, for example, an aliphatic, aromatic or araliphatic carboxylic acid, and furthermore an acyl residue, especially the acyl residue of an aliphatic, aromatic or araliphatic carboxylic acid.

An aliphatic hydrocarbon residue is an alkyl, alkenyl or alkynyl residue, especially a lower alkyl or lower alkenyl, as well as a lower alkynyl residue, which can, for example, contain up to seven, preferably up to four, carbon atoms. Such residues can optionally be mono-, di- or polysubstituted by functional groups, for example, by free, etherified or esterified hydroxyl or mercapto groups, such as lower alkoxy, lower alkenyloxy, lower alkylenedioxy, optionally substituted phenyloxy or phenyl-lower alkoxy, lower alkylmercapto or optionally substituted phenylmercapto or phenyl-lower alkyl-mercapto, lower alkoxycarbonyloxy or lower alkanoyloxy groups, as well as halogen atoms, and furthermore by nitro groups, optionally substituted amino groups, oxo groups, optionally functionally converted carboxyl, as well as sulfo groups, such as carbo-lower alkoxy, optionally N-substituted carbamoyl or cyano groups, and/or acyl, e.g., lower alkanoyl groups.

Cycloaliphatic or cycloaliphatic-aliphatic hydrocarbon residues are, for example, monocyclic, bicyclic or polycyclic cycloalkyl or cycloalkenyl groups, as well as cycloalkyl- or cycloalkenyl-lower alkyl or -lower alkenyl groups, wherein cycloalkyl residues contain, for example, up to 12, such as three to eight, preferably three to six, ring carbon atoms, while a cycloalkenyl residue possesses, for example, up to 12, such as three to eight, especially five to eight, preferably five or six, ring carbon atoms as well as one to two double bonds; the aliphatic portion of cycloaliphatic-aliphatic residues can, for example, contain up to seven, preferably up to four, carbon atoms. The above cycloaliphatic or cycloaliphatic-aliphatic residues can, if desired, be mono-, di- or polysubstituted, for example, by optionally substituted aliphatic hydrocarbon residues, such as, for example, the optionally substituted lower alkyl groups mentioned above, or, for example, like the above-mentioned aliphatic hydrocarbon residues, by functional groups.

An aromatic hydrocarbon residue is, for example, a monocyclic or bicyclic aromatic hydrocarbon residue, especially a phenyl, as well as a biphenylyl or naphthyl residue which can optionally be mono-, di- or polysubstituted, for example, like the above-mentioned aliphatic and cycloaliphatic hydrocarbon residues.

An araliphatic hydrocarbon reside is an optionally substituted aliphatic hydrocarbon residue possessing, for example, up to three optionally substituted, monocyclic or bicyclic aromatic hydrocarbon residues and primarily represents a phenyl-lower alkyl or phenyl-lower alkenyl, as well as phenyl-lower alkynyl residue, with such residues containing one to three phenyl groups and optionally being mono-, di- or polysubstituted in the aromatic and/or aliphatic portion, for example, like the above-mentioned aliphatic and cycloaliphatic residues.

A bivalent aliphatic hydrocarbon residue is primarily a lower alkylene, as well as a lower alkenylene residue which, for example, contains up to eight, preferably four to five, carbon atoms and which can, if desired, be substituted, for example, like the above-mentioned cycloaliphatic residues.

The heterocyclic portion of a heterocyclic or heterocyclic-aliphatic residue is especially a monocyclic, as well as bicyclic or polycyclic azacyclic, thiacyclic, oxacyclic, thiazacyclic, oxazacyclic or diazacyclic residue of aromatic character, which can optionally be mono-, di- or polysubstituted, for example, like the above-mentioned cycloaliphatic residues. The aliphatic portion is heterocyclic-aliphatic residues can, for example, have the significance given for the corresponding cycloaliphatic-aliphatic or araliphatic residues.

The acyl residue of a carbonic acid semi-derivative is preferably the acyl residue of a corresponding half-ester, wherein the esterifying organic residue represents an optionally substituted aliphatic, cycloaliphatic, cycloaliphatic-aliphatic, aromatic or or araliphatic hydrocarbon residue or a heterocyclic-aliphatic residue, primarily the residue of an optionally substituted lower alkyl half-ester of carbonic acid (i.e., a carbo-lower alkoxy residue which is optionally substituted in the lower alkyl portion), as well as a lower alkenyl, cycloalkyl, phenyl or phenyl-lower alkyl half-ester of carbonic acid which is optionally substituted in the lower alkenyl, cycloalkyl, phenyl or phenyl-lower alkyl portion (i.e., a carbo-lower alkenyloxy, carbo-cycloalkoxy, carbophenyloxy or carbo-phenyl-lower alkoxy residue which is optionally substituted in the lower alkenyl, cycloalkyl, phenyl or phenyl-lower alkyl portion). Acyl residues of a carbonic acid half-ester are, furthermore, acyl residues of lower alkyl half-esters or carbonic acid, in which the lower alkyl portion contains a heterocyclic group, for example, one of the above-mentioned heterocyclic groups of aromatic character as substituent, and wherein the lower alkyl residue and the heterocyclic group can optionally be substituted; such acyl residues are carbo-lower alkoxy groups which contain an optionally substituted heterocyclic group of aromatic character in the lower alkyl residue.

The acyl residue of an aliphatic carboxylic acid is, for example, the corresponding residue of an alkanecarboxylic, as well as alkenecarboxylic or alkynecarboxylic acid, primarily lower alkanecarboxylic, as well as lower alkenecarboxylic or lower alkynecarboxylic acid, which is optionally substituted, for example, like the above-mentioned aliphatic hydrocarbon residues, and which can, for example, contain up to seven, especially up to four, carbon atoms.

The acyl residue of a cycloaliphatic or cycloaliphatic-aliphatic carboxylic acid is, for example, the acyl residue of a cycloalkanecarboxylic or cycloalkenecarboxylic acid or cycloalkyl- or cycloalkenyl-lower alkanecarboxylic or -lower alkenecarboxylic acid, which is optionally substituted, for example, like the above-mentioned cycloaliphatic or cycloaliphatic-aliphatic hydrocarbon residues, and in which a cycloalkyl or cycloalkenyl residue, as well as the aliphatic portion of cycloaliphatic-aliphatic carboxylic acids can, for example, have the number of carbon atoms and/or double bonds specified above for corresponding residues and can optionally be substituted, for example, as indicated.

The acyl residue of an aromatic carboxylic acid is primarily the residue of a monocyclic or bicyclic aromatic carboxylic acid, which can optionally be substituted, for example, like the above-mentioned cycloaliphatic residue.

The araliphatic portion in the acyl residue of an araliphatic carboxylic acid has, for example, the above-mentioned significance; an araliphatic carboxylic acid primarily denotes a phenyl-lower alkanecarboxylic or phenyl-lower alkenecarboxylic acid, in which the phenyl residue and/or the aliphatic portion can optionally be substituted, for example, like the above-mentioned cycloaliphatic or aliphatic groups.

In the acyl residue of a heterocyclic carboxylic acid the heterocyclic residue is primarily of aromatic character and is preferably a monocyclic, as well as a bicyclic or polycyclic residue. It primarily represents a monocyclic, as well as bicyclic or polycyclic azacyclic, oxacyclic, thiacyclic, diazacyclic, oxazacyclic or thiazacyclic residue which is optionally substituted, for example, like the above-mentioned cycloaliphatic residue.

In the acyl residue of a heterocyclic-aliphatic carboxylic acid the heterocyclic residue has, for example, the above-mentioned significance, while the aliphatic portion, like, for example, in an araliphatic carboxylic acid, represents an optionally substituted lower alkyl, as well as lower alkenyl residue.

A hydroxyl group which is etherified by an optionally substituted aliphatic hydrocarbon residue is, for example, an alkoxy, as well as alkenyloxy or alkynyloxy group, especially a lower alkoxy, as well as lower alkenyloxy or lower alkynyloxy group, wherein the organic residues of these groups can, for example, like the above-mentioned aliphatic hydrocarbon residues, be mono-, di- or max by functional groups, such as free, etherified or esterified hydroxyl or mercapto groups, nitro groups, optionally m$\mu$ amino, optionally functionally converted carboxyl or acyl groups.

Etherified hydroxyl groups are, furthermore, optionally substituted phenyloxy, phenyl-lower alkoxy or phenyl-lower alkenyloxy groups, wherein the hydrocarbon residues of hydroxyl groups etherified in such a manner can be mono-, di- or polysubstituted by hydrocarbon groups or functional groups, e.g., as specified above.

A lower alkyl residue is, for example, a methyl, ethyl, n-propyl, isopropyl, n-butyl, isobutyl, sec.-butyl or tert.-butyl, as well as n-pentyl, isopentyl, n-hexyl, isohexyl or n-heptyl group, whereas a lower alkenyl residue can, for example, be a vinyl, allyl, isopropenyl, 2- or 3-methyallyl or 3-butenyl group, and a lower alkynyl residue, for example, a propargyl or 2-butinyl group.

Optionally substituted aliphatic hydrocarbon residues, especially lower alkyl groups, which can, inter alia, also substitute cycloaliphatic, cycloaliphatic-aliphatic, aromatic, araliphatic, heterocyclic or heterocyclic-aliphatic residues, contain, for example, the above-mentioned substituents. Such substituted groups are, for example, hydroxy-lower alkyl or lower alkoxy-lower alkyl groups, and especially halogeno-lower alkyl groups, such as monohalogenated, dihalogenated or polyhalogenated lower alkyl groups, for example, methyl, ethyl or 1-propyl or 2-propyl groups. Residues of the latter type, especially 2-halogen-lower alkyl residues, such as 2,2,2-trichloroethyl or 2-iodoethyl groups, primarily represent halogenated lower alkyl residues $R_1$.

A cycloalkyl group is, for example, a cyclopropyl, cyclobutyl, cyclopentyl, cyclohexyl or cycloheptyl, as well as an adamantyl group, and a cycloalkenyl group is, for example, a 2- or 3-cyclopentenyl, 1-, 2- or 3-cyclohexenyl or 3-cycloheptenyl, as well as 2-cyclopropenyl group. A cycloalkyl-lower alkyl or -lower alkenyl residue is, for example, a cyclopropyl-, cyclopentyl-, cyclohexyl- or cycloheptyl-methyl, -1,1-ethyl or -1,2-ethyl, -1,1-propyl, -1,2-propyl or -1,3-propyl, -vinyl or -allyl group, while a cycloalkenyl-lower alkyl or -lower alkenyl group represents, for example, a 1-, 2- or 3-cyclopentenyl-, 1-, 2- or 3-cyclohexenyl- or 1-, 2- or 3-cycloheptenyl-methyl, -1,1-ethyl or -1,2-ethyl, -1,1-propyl, -1,2-propyl or -1,3-propyl, -vinyl or -allyl group.

A naphthyl residue is a 1- or 2-naphthyl residue, while a biphenylyl group is primarily a 4-biphenylyl group.

A phenyl-lower alkyl or phenyl-lower alkenyl residue is, for example, a benzyl, 1- or 2-phenylethyl, 1-, 2- or 3-phenylpropyl, diphenylmethyl, trityl, 1- or 2-naphthylmethyl, styryl or cinnamyl residue.

A lower alkylene or lower alkenylene residue is, for example, represented by 1,2-ethylene, 1,3-propylene, 2,2-dimethyl-1,3-propylene, 1,4-butylene, 1- or 2-methyl-1,4-butylene, 1,4-dimethyl-1,4-butylene, 1,5-pentylene, 1-, 2- or 3-methyl-1,5-pentylene, 1,6-hexylene, 2-buten-1,4-ylene or 2- or 3-penten-1,5-ylene group.

Heterocyclic residues of aromatic character are, for example, monocyclic monoazacyclic, monothiacyclic or mono-oxacyclic residues of aromatic character, such as pyridyl, e.g., 2-, 3- or 4-pyridyl residues, thienyl, e.g., 2-thienyl residues, or furyl, e.g. 2-furyl residues, or bicyclic monoazacyclic residues of aromatic character, such as quinolinyl, e.g., 2-quinolinyl or 4-quinolinyl residues, or isoquinolinyl, e.g., 1-isoquinolinyl residues, or monocyclic thiazacyclic or oxazacyclic, as well as diazacyclic residues of aromatic character, such as oxazolyl, isoxazolyl, thiazolyl or isothiazolyl, as well as pyrimidinyl residues. Heterocyclic-aliphatic residues are lower alkyl or lower alkenyl residues which contain heterocyclic residues, such as those mentioned above.

Among the etherified hydroxyl groups there are primarily to be mentioned lower alkoxy, for example, methoxy, ethoxy, n-propyloxy, isopropyloxy, n-butyloxy, isobutyloxy, sec.-butyloxy, tert.-butyloxy, n-pentyloxy or tert.-pentyl-oxy groups, as well as substituted lower alkoxy groups, such as halogeno-lower alkoxy groups, especially 2-halogeno-lower alkoxy, for example, 2,2,2-trichloroethoxy or 2-iodoethoxy groups, and furthermore lower alkenyloxy, for example, vinyloxy or allyloxy groups, lower alkylenedioxy, for example, methylenedioxy or ethylenedioxy, as well as isopropylidene-dioxy groups, phenyloxy groups, or phenyl-lower alkoxy, for example, benzyloxy or 1- or 2-phenylethoxy groups, or lower alkoxy groups, which are substituted by monocyclic monoazacyclic, monooxacyclic or monothiacyclic groups of aromatic character, such as pyridyl-lower alkoxy, for example, 2-pyridylmethoxy, furyl-lower alkoxy, for example, furfuryl-oxy, or thienyl-lower alkoxy, for example 2-thenyloxy groups.

Etherified mercapto groups are, for example, lower alkylmercapto, e.g., methylmercapto or ethylmercapto groups, phenylmercapto groups, or phenyl-lower alkylmercapto, for example, benzylmercapto groups.

Esterified hydroxyl groups are primarily halogen atoms, for example, fluorine, chlorine, bromine or iodine atoms, as well as lower alkanoyloxy groups, for example, acetyloxy or propionyloxy groups.

Substituted amino groups are mono- or di-substituted amino groups, which contain as substituents primarily optionally substituted monovalent or divalent aliphatic, cycloaliphatic, cycloaliphatic-aliphatic, aromatic or araliphatic hydrocarbon residues, as well as acyl groups. Such amino groups are especially lower alkylamino or di-lower alkylamino, for example, methylamino, ethylamino, dimethylamino or diethylamino groups, or lower alkyleneamino groups which are optionally interrupted by hetero-atoms, such as oxygen or sulphur atoms, as well nitrogen atoms which are optionally substituted, for example, by lower alkyl groups, such as pyrrolidino, piperidino, morpholino, thiamorpholino or 4-methyl-piperazino groups, as well as acylamino, especially lower alkanoylamino, such as acetylamino or propionylamino groups.

A carbo-lower alkoxy residue is, for example, a carbomethoxy, carbethoxy, carbo-n-propyloxy, carboisopropyloxy, carbo-tert.-butyloxy or carbo-tert.-pentyloxy group.

Optionally N-substituted carbamoyl groups are, for example, N-lower alkyl- or N,N-di-lower alkyl-carbamoyl groups, such as N-methyl-, N-ethyl-, N,N-dimethyl- or N,N-diethyl-carbamoyl groups.

A carbo-lower alkenyl residue is, for example, the carbovinyloxy group, while carbo-cycloalkoxy and carbo-phenyl-lower alkoxy groups, in which the cycloalkyl or phenyl-lower alkyl residue have the above-mentioned significance, for example, represent carbo-adamantyloxy or carbo-benzyloxy, as well as carbo-diphenylmethoxy or carbo-(α-4-biphenylyl-α-methyl-ethoxy) groups. Carbo-lower alkoxy groups, in which the lower alkyl residue is substituted by monocyclic, mono-azacyclic, monooxacyclic or monothiacyclic groups are, for example, carbo-furyl-lower alkoxy, such as carbofurfuryloxy groups, or carbo-thienyl-lower alkoxy, such as carbo-2-thenyloxy groups.

A lower alkanecarboxylic or lower alkenecarboxylic acid is, for example, acetic, propionic, butyric, isobutyric, valeric, pivalic or acrylic acid, while a cycloalkanecarboxylic or cycloalkenecarboxylic acid, or a cycloalkyl- or cycloalkenyl-lower alkanecarboxylic or -lower alkenecarboxylic acid denotes, for example, a cyclopentanecarboxylic, cyclohexanecarboxylic or 3-cyclohexenecarboxylic acid, cyclopentylpropionic, cyclohexylacetic, 3-cyclohexenylacetic or hexahydrocinnamic acid.

A monocyclic or bicyclic aromatic carboxylic acid is, for example, benzoic acid or 1- or 2-naphthalenecarboxylic acid, and a phenyl-lower alkanecarboxylic or phenyl-lower alkenecarboxylic acid is, for example, phenylacetic, phenyl-propionic or cinnamic acid.

As heterocyclic carboxylic acids, nicotinic or isonicotinic acid, 2-thiophenecarboxylic, 2-furanecarboxylic, 2- or 4-quinolinecarboxylic or 1-isoquinolinecarboxylic acid may be mentioned, and as corresponding lower alkanecarboxylic or lower alkenecarboxylic acids substituted by heterocyclic residues, for example, 2-, 3- or 4-pyridylacetic, 2-thienyl-acetic, 2-furylacetic or 2-furylacrylic acid.

The above carboxylic acids also furnish the above mentioned acyl, particularly lower alkanoyl, e.g., acetyl or propionyl residues.

The compounds of the present invention may be in the form of mixtures of isomers or in the form of pure isomers.

The compounds according to the invention show valuable, primarily pharmacological, properties. Thus, compounds of formula I, in which $R_1$ preferably represents a hydrogen atom and $R_2$ denotes an acyl residue, especially one of the acyl residues occurring in pharmacologically active N-acyl derivatives of 6-amino-penicillanic acids or 7-amino-cephalosporanic acids, are active against micro-organisms, especially against grampositive bacteria, such as *Staphylococcus aureus* and *Proteus vulgaris*, as well as gram-negative bacteria, such as *Escherichia coli*. In vitro experiments with these compounds show growth-inhibiting actions against the above-mentioned organisms at dilutions of down to 0.0001 percent. These new compounds are, therefore, useful accordingly in the treatment of infections with microorganisms, such as those mentioned above.

In contrast to the known 7-amino-cephalosporanic acid compounds, which also possess the basic structure of 7-amino-8-oxo-5-thia-1-azabicyclo[4,2,0]oct-2-ene-2-carboxylic acid or 7-amino-$\Delta^3$-cephem-4-carboxylic acid, an isomerization to the corresponding 3-ene- or $\Delta^2$-compounds cannot occur in the compounds of the present invention; it is known that this isomerization, which in the 7-amino-cephalosporanic acid series leads to the structurally more stable 7-amino-isocephalosporanic acid compounds, is coupled with a total loss of pharmacological activity.

The compounds of formula I, especially those, in which $R_1$ represents a preferably easily removable organic residue of an alcohol and $R_2$ represents a hydrogen atom or an acyl residue, or in which $R_1$ stands for a hydrogen atom and $R_2$ represents a hydrogen atom or an acyl residue which is preferably easily removable, for example, the easily removable acyl residue of a carbonic acid semi-derivative, especially, which can be converted to the above-mentioned pharmacologically active compounds in a manner which is in itself known.

The invention primarily relates to compounds of the formula

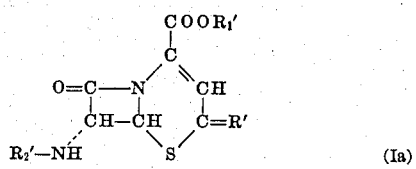

(Ia)

having the configuration of 7-amino-cephalosporanic acid, or salts of such compounds having salt-forming groups, wherein $R_1'$ represents above all a hydrogen atoms, as well as a lower alkyl, such as a methyl or ethyl, especially tert.-butyl, as well as tert.-pentyl residue, a halogeno-lower alkyl, primarily a 2-halogeno-lower alkyl, such as 2,2,2-trichloroethyl or 2-iodoethyl, a cycloalkyl, e.g., an adamantyl residue, or a phenyl-lower alkyl, especially a diphenylmethyl residue, primarily an easily removable residue of the above type, $R_2'$ represents a hydrogen atom or an acyl residue, which occurs in pharmacologically active N-acyl derivatives of 6-amino-penicillanic acid or 7-amino-cephalosporanic acid, such as, for example, the residue of the formula $Y-(C_mH_{2m})-CO-$, wherein $m$ represents an integer from 0 to 4, preferably 1, and a carbon atom of the preferably unbranched alkylene residue of formula $-(C_mH_{2m})-$ can optionally be substituted by an optionally substituted amino group, a free, etherified or esterified hydroxyl or mercapto group or a free or functionally modified carboxyl group, for example, by one of the above-mentioned groups of this nature, and wherein Y represents an aromatic or cycloaliphatic hydrocarbon residue or heterocyclic residue, the latter preferably of aromatic character, which is optionally substituted in the nucleus, for example, by the substituents mentioned for the above alkylene residue, as well as by sulfo or nitro groups, or represents a hydroxyl or mercapto group which is etherified by an aromatic or cycloaliphatic hydrocarbon residue or a heterocyclic residue, the latter preferably of aromatic character, and, for example, denotes a 2,6-dimethoxybenzoyl, tetrahydronaphthoyl, 2-methoxynaphthoyl, 2-ethoxynaphthoyl, phenylacetyl, phenyloxyacetyl, phenylthioacetyl, bromophenylthioacetyl, 2-phenyloxypropionyl, α-phenyloxy-phenylacetyl, α-methoxy-phenylacetyl, α -methoxy-3,4-dichloro-phenylacetyl, α-cyano-phenylacetyl, phenylglycyl (having an optionally protected amino group), benzyloxycarbonyl, benzylthioacetyl, benzylthiopropionyl, hexahydrobenzyloxycarbonyl, cyclopentanoyl, α-amino-cyclopentanoyl or α-amino-cyclohexanoyl (having an optionally protected amino group), 2-thienylacetyl, α-cyano-2-thienylacetyl, α-amino-2-thienylacetyl (having an optionally protected amino group), 3-thienylacetyl, 2-furylacetyl, 2-phenyl-5-methyl-isoxazolylcarbonyl or 2-(2-chloro-phenyl)- 5-methyl-isoxazolyl-carbonyl group, or represents a residue of the formula $C_nH_{2n+1}CO-$ or $C_nH_{2n-1}CO-$, wherein $n$ represents an integer up to 7 and the chain may be linear or branched and may be optionally interrupted by an oxygen or sulphur atom and/or may be substituted, for example, by halogen atoms, trifluoromethyl, free or functionally modified carboxyl, such as cyano, free or substituted amino, as well as nitro groups, and, for example, denotes a propionyl, butyryl, hexanoyl, octanoyl, butylthio-acetyl, acrylyl, crotonyl, 2-pentenoyl, allylthioacetyl, chloroacetyl, 3-chloropropionyl, 3-bromopropionyl, aminoacetyl, 2-carboxypropionyl, cyanoacetyl or 2-cyano-3-dimethyl-acryloyl group, or represents a residue of the formula $Z-NH-CO-$, wherein Z denotes an optionally substituted aromatic or aliphatic hydrocarbon residue, especially a lower alkyl residue which is substituted by lower alkoxy groups and/or halogen atoms, or represents an easily removable acyl residue of a half-ester of carbonic acid, such as a carbo-lower alkoxy residue, which is optionally substituted, for example, by halogen atoms, for example, carbo-tert.-butyloxy, carbo-tert.-pentyloxy or carbo-2,2,2-trichloroethoxy residue, a carbo-cycloalkoxy, for example, carbo-adamantyloxy residue, a carbophenyl-lower alkoxy, for example, carbo-diphenylmethoxy or carbo-(α-4-biphenylyl-α-methyl-ethoxy)-residue, or a carbo-furyl-lower alkoxy, for example, carbo-furfuryloxy residue, and R' represents a methylene group which is substituted by lower alkyl, especially methyl residues, or lower alkyl optionally substituted by hydroxy or halogeno, as well as lower alkanoyl, especially acetyl or propionyl residues, and also cycloalkyl, for example, cyclopentyl or cyclohexyl residues, or by phenyl or phenyl-lower alkyl residues which optionally contain substituents, for example, those mentioned above, such as aliphatic hydrocarbon residues, for example, lower alkyl groups, or etherified or esterified hydroxyl groups, for example, lower alkoxy groups or halogen atoms, or nitro groups, as well as by benzoyl residues, whereby such methylene group may contain only one (for example, a lower alkyl, phenyl or phenyl-lower alkyl group), or two (for example, lower alkyl groups) of the above-mentioned substituents.

Compounds of particular value as pharmacologically active substances and also as intermediates are 7N-$R_2''$-amino-8-oxo-4-methylene-5-thia-1-azabicyclo[4,2,0]oct-2-ene-2-carboxylic acids (7N-$R_2''$-amino-2-methylene-$\Delta^3$-cephem-4-carboxylic acids) or lower alkyl esters thereof, as well as salts of such compounds having salt-forming groups, in which $R_2''$ represents a hydrogen atom or an acyl residue of pharmacologically active 6-N-acylamino-penicillanic acid or 7-N-acylamino-cephalosporanic acid compound, such as one of the above-mentioned residues, especially a phenylacetyl, cyanoacetyl, phenylglycyl or phenyloxyacetyl, as well as thienylacetyl, $\alpha$-amino-thienylacetyl, $\alpha$-amino-cyclohexylcarbonyl or N-2-chloroethylcarbamyl residue, or an easily, particularly under acidic conditions, removable carbo-lower alkoxy group, especially the carbo-tert.-butyloxy group, and the methylene group is substituted by one or two lower alkyl residues, especially methyl residues, or by a cycloalkyl residue, or by a phenyl, as well as phenyl-lower alkyl residue which optionally contains in the nucleus lower alkyl, lower alkoxy or nitro groups or halogen atoms as substituents, and in which the lower alkyl residue of an ester grouping can optionally possess one or more halogen atoms, preferably in the 2-position, and primarily represent the tert.-butyl, as well as the 2,2,2-trichloroethyl or 2-iodoethyl residue.

The compounds of the present invention can be prepared, when a compound of the formula

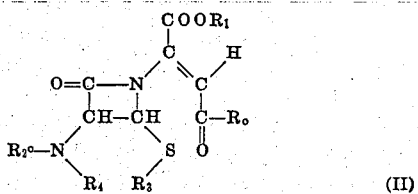

(II)

wherein $R_1$ has the above given meaning, being primarily one of the previously mentioned organic residues, especially one of the easily removable residues, $R_2°$ stands for hydrogen or an acyl residue $Ac°$ which is easily removable under acidic conditions, $R_3$ denotes an organic residue and $R_4$ is a hydrogen atom, when $R_2°$ represents an acyl group $Ac°$, or $R_3$ and $R_4$ together denote a disubstituted carbon atom, when $R_2°$ represents a hydrogen atom or an acyl group $Ac°$, and $R_0$ represents a methyl residue having at least one hydrogen atom and being mono- or disubstituted by optionally substituted hydrocarbon residues, optionally substituted heterocyclic residues or optionally substituted heterocyclic-aliphatic residues, in which a heterocyclic group has aromatic character, or functional groups, is subjected to ring closure by treatment with an acidic reagent, and, if desired, a compound of the formula I resulting from the procedure is converted into another compound of the Formula I and/or, if desired, a compound possessing salt-forming groups is converted to a salt or a resulting salt is converted to the free compound or to another salt and/or, if desired, a resulting isomer mixture is resolved into the individual isomers.

In the starting material of Formula II, $R_1$ represents a hydrogen atom, but primarily an easily removable organic residue of an alcohol, for example, a reductively removable organic residue of an alcohol, for example, a 2-halogeno-lower alkyl residue, such as a 2-polychloro-, 2-polybromo- or 2-iodo-lower alkyl residue, especially the 2,2,2-trichloroethyl, as well as 2-iodoethyl residue, or an organic residue of an alcohol which can be removed under acid conditions, such as a methyl residue which is substituted, e.g., by optionally substituted aliphatic or aromatic hydrocarbon residues, for example, the benzhydryl, trityl, tert.-butyl or tert.-pentyl, furthermore the adamantyl residue.

An acyl residue $Ac°$, easily removable under acidic conditions, is primarily the acyl residue of a carbonic acid-semiester easily removable under such conditions, such as a carbo-lower alkoxy residue, which in $\alpha$-position of the lower alkyl portion is branched and/or substituted in $\alpha$- or $\beta$-position, e.g., by optionally substituted aromatic or araliphatic hydrocarbon residues, such as phenyl or 4-biphenylyl groups, or by optionally substituted heterocyclic residues of aromatic character, such as 2-furyl groups, or halogen, e.g., chlorine atoms, furthermore, a carbo-lower alkenyloxy residue or a carbo-cycloalkoxy residue optionally substituted in $\alpha$-position, especially, for example, the carbo-tert.-butyloxy residue, as well as carbo-tert.-pentyloxy, carbo-vinyloxy, carbo-adamantyloxy or carbo-furfuryloxy residue, and also the carbo-($\alpha$-4-biphenylyl-$\alpha$-methyl-ethoxy) residue.

In the starting material of Formula II and optionally substituted hydrocarbon residue $R_3$ primarily represents and easily removable aliphatic hydrocarbon residue which in the linkage position is preferably unsaturated, such as a lower alkenyl residue, especially a 2-propenyl residue, or substituted by a hetero-residue, for example, by an etherified or esterified hydroxyl group, for example, a lower alkoxy or lower alkanoyloxy group or a halogen atom, such as a lower alkyl, for example, methyl, ethyl, n-propyl or isopropyl residue, as well as an appropriate cycloaliphatic, cycloaliphatic-aliphatic or araliphatic hydrocarbon residue which is preferably unsaturated in the linkage position or substituted by a hetero-residue.

Usually the groups $R_3$ and $R_4$ together form a disubstituted carbon atom; its substituents are optionally substituted hydrocarbon residues, such as optionally substituted aliphatic, cycloaliphatic, cycloaliphatic-aliphatic, aromatic or araliphatic hydrocarbon residues. The two substituents of the disubstituted carbon atom can also be taken together and represent, for example, a bivalent aliphatic hydrocarbon residue which is optionally substituted and/or interrupted by hetero-atoms. Above all, the two residues $R_3$ and $R_4$ together represent a carbon atom which is disubstituted by two lower alkyl, especially methyl groups.

According to the present invention the above ring closure is preformed by treatment with a strong, preferably oxygen-containing, inorganic or organic acid, for example, an organic carboxylic or sulphonic acid, especially with a strong lower alkanecarboxylic acid, which is optionally substituted by hetero atoms or residues and is preferably halogeno-substituted, such as an $\alpha$-halogenoacetic acid or $\alpha$-halogenopropionic acid, in which halogen preferably denotes fluorine, as well as chlorine, primarily trifluoroacetic acid, and also an aryl-sulphonic acid, such as p-toluenesulphonic acid, as well as mixtures of acids, e.g., p-toluene sulfonic and acetic acid. The process is carried out in the absence or presence of an inert solvent, for example, dioxane, or of a mixture of diluents, preferably while cooling, for example, at temperatures of about −30°C to about +10°C, preferably at about −25°C to about 0°C, if necessary, in an inert gas atmosphere, such as nitrogen atmosphere.

A resulting compound of the Formula I may be converted into another compound of the Formula I; such conversion may also take place under the acidic conditions of the ring-closure. Thus, an acyl group $Ac°$, easily removable under acidic conditions, particularly the carbo-tert.-butyloxy group, and/or an ester grouping, which is easily split under acidic conditions, such as a carbo-tert.-butyloxy group, may be removed and be converted into a free carboxyl group, respectively. Thus, in a corresponding starting material of the Formula II a carbo-tert.-butyloxy group $Ac°$ and/or a carbo-tert.-butyloxy group —$COOR_1$ may be removed and/or converted into the free carboxyl group by treatment with trifluoroacetic acid. Furthermore, under the acidic conditions a residue R, such as a cyclopropylidene group, may be converted into another group R, the latter, for example, into the 3-hydroxy-1,1-propylidene group.

In a compound obtainable in accordance with the process a suitably esterified carboxyl group can be liberated in a manner which is in itself known. Thus, an esterified carboxyl group which, for example, contains a polysubstituted methyl group, such as the benzhydryl, tert.-butyl, tert.-pentyl or adamantyl group can be liberated by treatment with an acid, such as trifluoroacetic acid. As mentioned above, such reaction may take place simultaneously with the ring-closure performed in accordance with the invention, that is to say under acid conditions, especially in the presence of trifluoroacetic acid.

Furthermore, a carboxyl group esterified by, for example, a 2-halogeno-lower alkyl group, such as the 2,2,2-trichloroethyl, as well as 2-iodoethyl group, can be liberated reductively, for example, by treatment with a chemical reducing agent, such as with suitable metals, metal alloys or metal amalgams, advantageously in the presence of hydrogen-furnishing reagents which, together with the metals, metal alloys or metal amalgams, produce nascent hydrogen, such as zinc, zinc alloys, for example, zinc-copper, or zinc amalgam, preferably in the presence of acids, which optionally contain water, or acidic reagents, such as organic carboxylic acids, for example, lower alkanecarboxylic acids, e.g. acetic acid, such as 90 percent aqueous acetic acid, furthermore ammonium chloride or pyridine hydrochloride, or alcohols, such as lower alkanols, optionally in the presence of acids, or alkali metal amalgams, for example, sodium or potassium amalgam, or aluminum amalgam, preferably in the presence of a moist solvent, such as ether or lower alkanols, furthermore by treatment with strongly reducing metal salts, such as chromium-II compounds, for example, chromium-II-chloride or chromium-II-acetate, preferably in the presence of aqueous media, containing water-miscible organic solvents, such as lower alkanols, lower alkanecarboxylic acids or ethers, for example, methanol, ethanol, acetic acid, tetrahydrofuran, dioxane, ethylene glycol dimethyl ether or diethylene glycol dimethyl ether.

Compounds having a free carboxyl group can, in a manner which is in itself known, for example, be converted to their salts, such as alkali metal, for example, sodium or potassium salts, or alkaline earth metal, for example, calcium or magnesium salts, or ammonium salts, for example, with ammonia or amines, or can be liberated from salts, for example, by treatment with acidic reagents.

Free carboxyl groups can be esterified according to methods which are in themselves known, for example, by treatment with a diazo compound, such as a diazo-lower alkane, for example, diazomethane or diazoethane, or with a phenyl-diazo-lower alkane, for example, phenyl-diazomethane or diphenyl-diazomethane, or by reaction with a hydroxyl compound suitable for esterification, such as, for example, an alcohol, in the presence of an esterifying agent, such as a carbodiimide, for example, dicyclohexylcarbodiimide, as well as carbonyldiimidazole, or according to any other known and suitable esterification process, such as reaction of a salt of the acid with a reactive ester of the hydroxyl compound, especially of an alcohol and a strong inorganic acid or a strong organic sulphonic acid. Furthermore, acid halides, especially acid chlorides, as well as activated esters, such as, for example, esters with N-hydroxy-nitrogen compounds, or reactive mixed anhydrides formed, e.g., with halogenoformic acid esters or trifluoroacetic acid, can be converted to esters by reaction with hydroxyl compounds, such as alcohols, optionally in the presence of a base, such as pyridine.

In compounds having a free amino group, the latter can be acylated according to methods which are in themselves known, for example, by treatment with an acid, especially an organic carboxylic acid or a reactive acid derivative thereof, such as a halide, for example, chloride or fluoride, an anhydride (including any suitable inner anhydride of an organic carboxylic acid, i.e., a ketene, or that of a carbamic or thiocarbamic acid, i.e., an isocyanate or isothiocyanate, as well as a mixed anhydride) or an activated ester. If necessary, for example, when using the free acid as the acylating agent, suitable condensing reagents, such as carbodiimides, for example, dicyclohexylcarbodiimide, can be employed. A free amino group, formed under the conditions of the ring closure according to the invention may, if desired, be acylated without isolating the product of the process.

In a resulting compound, an acyl group representing the residue $R_2$ may be replaced by hydrogen according to known methods, for example, by treatment with an imido halide-forming reagent, conversion of the imido halide into the corresponding imino ether and cleavage of the latter.

Imido halide-forming reagents are, for example, acid halides, e.g., chlorides or bromides, particularly those of phosphorus - containing acids, such as phosphorus oxyhalides or phosphorus trihalides and particularly pentahalides, e.g., phosphorus oxychloride, phsophorus trichloride and above all phosphorus pentachloride.

The reaction with the imido halide-forming reagent is preferably carried out in the presence of a suitable, particularly organic base, primarily a tertiary amine, e.g., a tertiary aliphatic amine or diamine, such as a tri-lower alkyl-amine, e.g. trimethylamine, triethylamine or ethyl-diisopropylamine, a monocyclic or bicyclic mono- or diamine, such as an N-substituted, e.g., N-lower alkylated alkylene-, azaalkylene- or oxaalkyleneamine, e.g., N-methyl-piperidine or N-methyl-morpholine, furthermore 2,3,4,6,7,8-hexahydropyrrolo[1,2-α]pyrimidine (diazabicyclononene; DBN), or of an aromatic tertiary amine, such as an N,N-di-lower alkyl-aniline, e.g., N,N-dimethylaniline, or primarily of a tertiary heterocyclic, mono- or bicyclic base, such as quinoline or isoquinoline, particularly pyridine. Advantageously, about equimolar amounts of the imido halide-forming reagent and of the base are used; however, the latter may be present in an excess or smaller amount, for example, in an about 0.2 to about 1 molar amount or alternatively in an about 10-fold, particularly a 3- to 5-fold excess.

The reaction with imido halide-forming reagent is advantageously performed while cooling, for example, at temperatures of about +10°C to about −50 °C; one may, however, also work at higher temperatures, for example, at up to 75°C, in case the stabilities of the starting material and the final products allow such increased temperatures.

The imido halide-compound, which usually is processed without isolation, is converted into the imino ether by treatment with alcohols, preferably in the presence of the above bases. Such alcohols are for example, aliphatic, as well as araliphatic alcohols, primarily optionally substituted, such as halogenated, e.g., chlorinated, or additional hydroxy groups containing lower alkanols, e.g., ethanol, tert.-butanol or 2,2,2-trichloroethanol, and particularly methanol, as well as optionally substituted phenyl-lower alkanols, such as benzyl alcohol. Usually, an excess, for example, an up to 100-fold excess of the alcohol is used, and the reaction is preferably carried out while cooling, for example, at temperatures of about +10°C to about −50°C.

Advantageously the imino ether compound is undergoing cleavage without isolation. The cleavage of the imino ether to the amine compound of the Formula I, in which $R_2$ stands for hydrogen, can be carried out by treatment with a suitable hydroxy compound. Water is preferably used as the reagent, or a mixture of an alcohol with water, normally in an acidic medium, for example, at a pH-value of about 1 to about 5, which, if necessary, is obtained by the addition of a basic reagent, such as an aqueous alkali metal hydroxide, e.g., sodium or potassium hydroxide, or of an acid, e.g., a mineral acid or an organic acid, such as hydrochloric, sulfuric, phosphoric, fluoboric, trifluoroacetic or p-toluene sulfonic acid.

The above three-step procedure for the liberation of the amino group from an acylamino group is advantageously carried out without isolating the intermediate imido halides and imino ethers, usually in the presence of an organic solvent, which is inert towards the reaction components, such as a halogenated aliphatic hydrocarbon, e.g., methylene chloride and/or in the atmosphere of an inert gas, e.g. nitrogen. Usually the carboxyl group in a compound of the Formula I undergoing the above de-acylation reaction is protected, advantageously in the form of an ester grouping, inclusive of a silyl or equivalent ester grouping.

An easily removable acyl group Ac° is removed according to known methods, a carbo-2-halogeno-lower alkoxy, e.g., carbo-2,2,2-trichloroethoxy or carbo-2-iodoethoxy group, for example, by treatment with a chemical reducing agent, such as zinc in the presence of aqueous acetic acid, or a carbo-lower alkoxy group branched or substituted in α-position of the lower alkyl portion such as carbo-tert.-butyloxy, for example, by treatment with a strong, oxygen-containing acid, e.g., trifluoro-acetic acid.

Resulting mixtures of isomers can be resolved into the individual isomers according to methods which are in themselves known, for example, by fractional crystallization adsorption chromatography (column or thin layer chromatography) or other processes. Resulting racemates can be resolved into the antipodes in the usual manner, for example, by forming a mixture of diastereoisomeric salts with optically active salt-forming reagents, resolving the mixture into the diastereoisomeric salts and converting the separated salts into the free compounds, or by fractional crystallization from optionally active solvents, with the more active antipode preferably being isolated.

The process also comprises those modifications according to which compounds formed as intermediates in the process are used as starting materials and the remaining process stages are carried out with these, or the process is interrupted at any stage; furthermore, starting materials can be used in the form of derivatives or may be formed during the reaction.

Preferably those starting materials are used and those reaction conditions are chosen that those compounds are obtained which are mentioned above as being particularly preferred.

The starting substances used in accordance with the process are obtained, when a compound of the formula

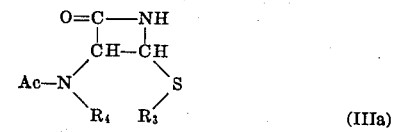

(IIIa)

wherein Ac represents an acyl residue, especially one of the easily removable acyl residues Ac° mentioned above, is reacted with a glyoxylic acid ester of the formula $O=CH-COOR°_1$ (IIIb), in which $R°_1$ denotes the organic residue of an alcohol, especially one of the above-mentioned easily removable residues, or a tautomer or derivative, for example, a hydrate, thereof, at elevated temperature, primarily at about 50°C to about 150°C, and in particular in the absence of a condensation agent and/or without the formation of a salt; if necessary, any water generated when using a hydrate, may removed by distillation, for example, azeotropically.

In a resulting compound of the formula

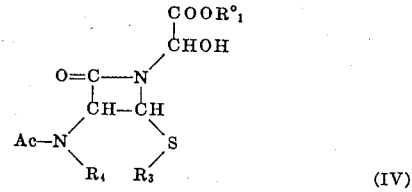

(IV)

the hydroxyl group can by treatment with a suitable esterifying agent, for example, a halogenating agent, such as a thionyl halide, for example, thionyl chloride, a phosphorus oxyhalide, especially oxychloride, or a halogenophosphonium halide, such as triphenylphosphine dibromide or diiodide, or a suitable organic sulphonic acid halide, such as a sulphonic acid chloride, preferably in the presence of a basic reagent, primarily an organic basic reagent, such as an aliphatic tertiary amine, for example, triethylamine or ethyldiisopropylamine, or a heterocyclic base of the pyridine type, for example, pyridine or collidine, be converted into a reactive esterified hydroxyl group, primarily into a halogen atom, or into an organic sulphonyloxy group.

Reaction of a resulting compound having the formula

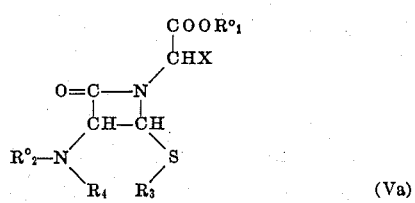

(Va)

wherein X represents the reactive esterified hydroxyl group, primarily a halogen atom, especially a chlorine or bromine atom, as well as an iodine atom, but also an organic sulphonyloxy group, primarily an aliphatic or aromatic sulphonyloxy group, for example, an optionally substituted lower alkyl-sulphonyloxy group, such as methylsulphonyloxy, ethylsulphonyloxy or 2-hydroxy-ethylsulphonyloxy group, or an optionally substituted phenylsulphonyloxy group, for example, 4-methyl-phenylsulphonyloxy, 4-bromophenylsulphonyloxy or 3-nitrophenylsulphonyloxy group, with a phosphine compound of the formula

(Vb)

wherein each of the groups $R_a$, $R_b$, and $R_c$ represents an optionally substituted hydrocarbon residue, primarily an optionally substituted lower alkyl or phenyl, for example, n-butyl or phenyl residue, preferably in the presence of an inert solvent, yields a phosphoranylidene compound of the formula

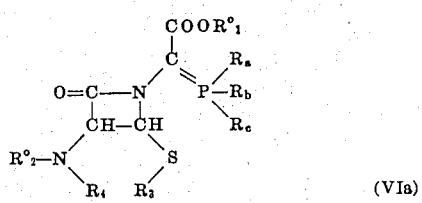

(VIa)

if necessary, after splitting-off the elements of an acid of the formula H—X from an intermediate phosphonium salt compound; the latter may, for example, be carried out by treatment with a weak base, especially an organic base, for example, diisopropylethylamine or pyridine.

On treatment of a compound of the Formula VIa with a compound of formula

(VIb)

or a tautomer or a reactive derivative, especially a hydrate, thereof, preferably at elevated temperature, for example, at about 50°C to about 150°C, the desired starting material of the Formula II is obtained. If necessary or desired, a resulting mixture of isomeric compounds is separated according to known methods and the starting materials of the Formula II may be obtained in pure form. Furthermore, it is possible to convert a pure isomer into the other or into a mixture of the isomers by isomerization, for example, by irradiation with ultraviolet light; by separating a resulting mixture of isomers, a further amount of the desired isomer can be obtained.

On any suitable step of the reaction sequence for the manufacture of the starting materials of the Formula II from compounds of the Formula IIIa, for example, in intermediates of the Formula Va, according to known methods, an acyl group Ac may be replaced by hydrogen, for example, as described above via the imido halide and imino ether, and, if desired or necessary, hydrogen may be replaced by the easily removable acyl group Ac°, for example, according to the above described acylating procedure. An easily removable acyl group Ac° may be removed in a per se known manner and, if desired, may be replaced by another acyl group Ac°.

The intermediates of the Formula (IIIa), used in the manufacture of the starting materials of the Formula II, in which $R_3$ and $R_4$ together represent a disubstituted carbon atom, are known. Others, in which $R_3$ denotes a removable organic residue and $R_4$ represents a hydrogen atom can, for example, be obtained by converting in a 6-N-acyl-amino-penicillanic acid compound the carboxyl group into the isocyanato group in a manner which is in itself known. Treating the isocyanate compound with a 2-halogeno-lower alkanol, for example, 2,2,2-trichlorethanol, and splitting the substituent in the 2-position in the resulting 6-N-acyl-amino-2-(N-carbo-2-halogeno-lower alkoxy-amino)-3,3-dimethyl-4-thia-1-azabicyclo-[3,2,0]heptan-7-one compound by treatment with a chemical reducing agent in the presence of water, for example, with zinc in the presence of 90 percent strength acetic acid. The corresponding 6-N-acyl-amino-2-hydroxy-3,3-dimethyl-4-thia-1-aza-bicyclo[3,2,0]heptan-7-one compound is thus obtained, which on treatment with a heavy metal acylate oxidizing agent, especially a lead-IV-carboxylate, such as a lead-IV-lower alkanoate, for example, lead tetraacetate, usually with irradiation, preferably with ultra-violet light, can be converted into a 3-N-acyl-amino-2-(2-acyloxy-2-propylmercapto)-1-formyl-azetidin-4-one compound. If desired, the acyloxy group together with hydrogen may be split off in the form of the corresponding acid by heating, with the 2-propenylmercapto grouping being formed. The formyl group bonded to the ring-nitrogen atoms can be removed by hydrolysis, alcoholysis, ammonolysis or aminolysis, as well as by treatment with a suitable decarbonylation agent, such as a tris-(tri-organically substituted phosphine)-rhodium halide, for example, tris-(triphenyl-phosphine)-rhodium chloride, in a suitable solvent, for example, benzene, or by conversion of the formyl group to the carbinol group, for example, by treatment with catalytically activated hydrogen in the presence of a palladium catalyst and glacial acetic acid or tetrahydrofuran, containing hydrochloric acid. If desired, the 2-acyloxy-2-propyl residue in a resulting compound can be replaced by a different organic residue by treatment with a weakly basic reagent, such as an alkali metal hydrogen carbonate or pyridine, in the presence of a reactive ester of an alcohol, such as a suitable halide.

The invention also comprised the starting materials of the Formula II, especially those of the formulas

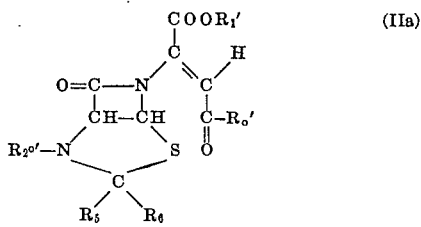

and

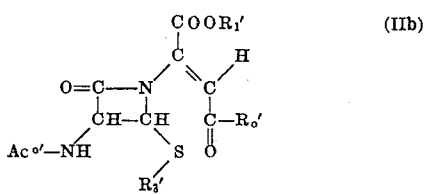

wherein $R_1'$ and $R_3'$ have the above-mentioned significance, $R_2^{o'}$ stands for hydrogen or the acyl residue $Ac^{o'}$, $Ac^{o'}$ represents an easily, especially under acidic conditions removable carbo-lower alkoxy, especially the carbo-tert.-butyloxy group, $R_3'$ is a 2-propenyl or 2-lower alkanoyloxy-2-propyl group, and each of $R_5$ and $R_6$ is lower alkyl, especially methyl, and $R_o'$ stands for a methyl residue, which contains at least one hydrogen atom and is substituted by lower alkyl, especially methyl residues, as well as lower alkanoyl, especially acetyl or propionyl residues, and also cycloalkyl, for example, cyclopentyl or cyclohexyl residues, or by phenyl or phenyl-lower alkyl residues which optionally contain substituents, for example, those mentioned above, such as aliphatic hydrocarbon residues, for example, lower alkyl groups, or etherified or esterified hydroxyl groups, for example, lower alkoxy groups or halogen atoms, or nitro groups, as well as by benzoyl residues, whereby such methyl group may contain only one (for example, a phenyl or phenyl-lower alkyl group), or two (for example, lower alkyl groups) of the above-mentioned substituents, as well as process for the manufacture of the starting materials of the formula II. In the compounds of the Formula II, IIa, and IIb the group of the formula —$COOR_1$ and —$COOR_1'$, respectively, and the group of the formula —$C(=O)$— $R_o$ and —$C(=O)$-$R_o'$, respectively, are in a trans-relationship to each other.

The compounds of the present invention, having useful pharmacological properties can be used in the form of pharmaceutical preparations, in which they are present as a mixture together with a solid or liquid pharmaceutical excipient, and which are suitable for enteral or parenteral administration. Suitable excipients which are inert towards the active substances are, for example, water, gelatine, saccharides, such as lactose, glucose or sucrose, starches, such as corn starch, wheat starch or arrowroot, stearic acids or salts thereof, such as magnesium stearate or calcium stearate, talc, vegetable fats and oils, alginic acid, benzyl alcohols, glycols or other known excipients. The preparations may be in a solid form, for example, as tablets, dragees, capsules or suppositories, or in a liquid form, for example, as solutions, suspensions or emulsions. They may be sterilized and/or contain auxiliary substances, such as preserving, stabilizing wetting, emulsifying, or solubilizing agents, salts for regulating the osmotic pressure and/or buffers. They may, furthermore, contain other pharmacologically useful substances. The pharmaceutical preparations, which are also encompassed by the present invention, can be manufactured in a manner which is in itself known.

The invention is described in more detail in the examples which follow; temperatures are given in degrees centigrade.

EXAMPLE 1

A solution of 0.1211 g of isomer A of α-(2carbotert.-butyloxy-3,3-dimethyl-7-oxo-4-thia-2,6-diaza-6-bicyclo [3,2,0]heptyl)-α-(phenylacetylmethylene)-acetic acid tert.-butyl ester in 1.2 ml of pre-cooled trifluoroacetic acid is allowed to stand for 21 hours at −20°C and is then diluted with 9 ml of dioxane. The mixture, containing the 7-amino-4-benzylidene-8-oxo-5-thia-1-azabicyclo[4,2,0]oct-2-ene-2-car-boxylic acid (configuration of 7-amino-cephalosporanic acid) or 7-amino-2-benzyliden-Δ³-cephem-4-carboxylic acid, is mixed with a solution of 0.129 g of phenyloxy-acetyl chloride in 1 ml of dioxane. After standing for 2½ hours at room temperature, the reaction mixture is treated with 1 ml of water and is allowed to stand for a further hour. The volatile constituents are removed by lyophilization under a high vacuum and the residue is chromatographed on 9 g of acid-washed silica gel. Phenyloxyacetic acid and a small quantity of a neutral material are eluted with a 100:5 5-mixture of benzene and acetone and the 4-benzylidene-7-N-phenyloxyacetyl-amino-8-oxo-5-thia-1-azabicyclo[4,2,0]oct-2-ene-2-carboxylic acid (configuration of 7-amino-cephalosporanic acid) or 2-benzylidene-7-N-phenyloxyacetyl-amino-Δ³-cephem-4-carboxylic acid of the formula

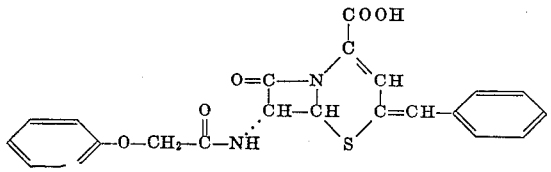

is eluted with a 2:1 1-mixture of benzene and acetone; after recrystallization from a mixture of acetone and benzene this material, in the form of yellowish crystals, melts at 191°–193°C (decomposition); thin layer chromatogram: Rf 0.36 (silica gel; in the system toluene/acetic acid/water, 5:4:1); ultra-violet absorption spectrum: in ethanol, $\lambda_{max}$ 349 m$\mu$ and 250-265 m$\mu$ (shoulder); in potassium hydroxide/ethanol, $\lambda_{max}$ 345 m$\mu$ and 250-265 m$\mu$ (shoulder); and in hydrogen chloride/ethanol, $\lambda_{max}$ 357 m$\mu$ and 250-265 m$\mu$ (shoulder); infrared absorption spectrum (in potassium bromide); characteristic bands at 2.90$\mu$ (shoulder), 3.20–4.15$\mu$, 5.62$\mu$, 5.70$\mu$ (shoulder), 5.82–5.95$\mu$, 6.00μ (shoulder), 6.10–6.15μ and 6.23–6.33μ (inflection).

EXAMPLE 2

A solution of 0.5625 g of isomer A of α-(2-carbo-tert.-butyloxy-3,3-dimethyl-7-oxo-4-thia-2,6-diaza-6-bicyclo-[3,2,0]heptyl)-α-(phenylacetylmethylene)-acetic acid tert.-butyl ester in 4 ml of trifluoroacetic acid, which has been precooled, is allowed to stand for 20 hours at −20°C and for 1 hour at room temperature. Thirty ml of dry dioxane are added as a diluent and the mixture, containing the 7-amino-4-benzyli-dene-8-oxo-5-thia-1-azabicyclo[4,2,0]oct-2-ene-2-carboxylic acid (configuration of 7-amino-cephalosporanic acid) or 7-amino-2-benzyliden-Δ³-cephem-4-carboxylic acid, is treated with a solution of 0.5 g of freshly distilled phenylacetyl chloride in 5 ml of dioxane. The reaction mixture is allowed to stand for 3 hours at room temperature and is then mixed with 2 ml of water; the mixture is allowed to stand for 1 hour at room temperature, and then cooled to −10°C, and the volatile constituents are evaporated off by lyophilization under a high vacuum. The residue is taken up in 4 ml of benzene, whereupon crystallization starts. The crystalline material is filtered off after 24 hours and washed with benzene; the 4-benzylidene-7-N-phenylacetyl-amino-8oxo-5-thia-1-azabicyclo[4,2,0]oct-2-ene-2-carboxylic acid (configuration of 7-amino-cephalosporanic acid) or 2-benzylidene-7-N-phenyl-acetyl-amino-Δ³-cephem-4-carboxylic acid of the formula

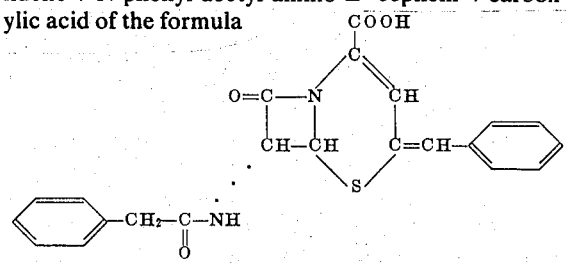

which after recrystallization from aqueous ethanol (90 percent) melts at 224°–226°C, is thus obtained; thin layer chromatogram: Rf 0.30 (silica gel; in the system toluene/acetic acid/water, 5:4:1); ultra-violet absorption spectrum: in ethanol, $\lambda_{max}$ 353 mμ and 250–265 mμ (shoulder); in potassium hydroxide/ethanol, $\lambda_{max}$ 347 mμ 250–265 mμ and 240 mμ (shoulder); and in hydrogen chloride/ethanol, $\lambda_{max}$ 358 mμ and 250–265 mμ; infrared absorption spectrum (in potassium bromide): characteristic bands at 3.00μ (shoulder), 3.10–4.10μμ, 5.75μ (shoulder), 5.80μ (shoulder), 5.90–5.95μ, 6.00μ (shoulder), 6.15μ, 6.24μ (shoulder), 6.28μ (shoulder), 6.55μ, 6.65μ and 6.73μ (shoulder).

The mother liquor is chromatographed on 10 g of acid-washed silica gel; phenylacetic acid together with a yellow neutral material are eluted with a 100:5-mixture of benzene and acetone, and thereafter a further quantity of 4-benzylidene-7-N-phenylacetyl-amino-8-oxo-5-thia-1-azabi-cyclo[4,2,0]oct-2-ene-2-carboxylic acid is eluted with a 2:1-mixture of benzene and acetone and crystallizes after adding a little acetone, m.p. 223°–225°C.

EXAMPLE 3

A solution of 0.0917 g of the isomer A of α-(2-carbo-tert.-butyloxy-3,3-dimethyl-7-oxo-4-thia-2,6-diaza-6bicyclo[3,2,0]heptyl)-α-(phenylacetylmethylene)-acetic acid tert.-butyl ester in 1 ml of pre-cooled trifluoroacetic acid is allowed to stand for 21 hours at −20°C and is then diluted with 7 ml of dioxane. The resulting mixture, containing the 7-amino-4-benzylidene-8-oxo-5-thia-1-azabicyclo[4,2,0]oct-2-ene-2-carboxylic acid (configuration of 7-amino-cephalosporanic acid) or 7-amino-2-benzyliden-Δ³-cephem-4-carboxylic acid, is treated with 10 drops of acetyl chloride. The reaction mixture is allowed to stand for 3 hours at room temperature, the excess acetyl chloride is removed under reduced pressure (oil pump) and 0.8 ml of water is added. After a further hour at room temperature, the volatile constituents are evaporated under reduced pressure (oil pump) and the residue is dissolved in 0.7 ml of benzene. The 7-N-acetyl-amino-4-benzylidene-8-oxo-5-thia-1-azabicyclo[4,2,0]oct-2-ene-2-carboxylic acid (configuration of 7-amino-cephalosporanic acid) or 7-N-acetylamino-2-benzylidene-Δ³-cephem-4-carboxylic acid of the formula

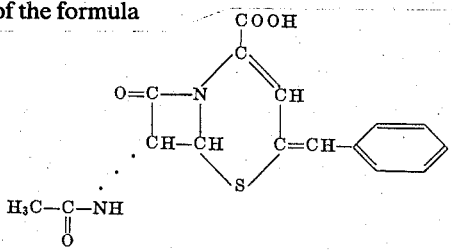

crystallizes out, m.p. 160°–164°C; thin layer chromatogram: Rf 0.16 (silica gel: in the system toluene/acetic acid/water, 5:4:1); ultra-violet absorption spectrum: in ethanol, $\lambda_{max}$ 354 mμ and 250–265 mμ (shoulder); in ethanol/potassium hydroxide$\lambda_{max}$ 346 mμ, 250–265 mμ and 240 mμ (shoulder), and in ethanol/hydrogen chloride, $\mu_{max}$ 357 mμ and 250–265 mμ (shoulder): infrared absorption spectrum (in potassium bromide): characteristic bands at 2.90μ (shoulder), 3.15–4.20μ 5.63–5.71μ, 5.75μ (shoulder), 5.80–5.94μ (inflection), 6.00μ (shoulder) 6.04–6.13μ and 6.40–6.70μ (inflection).

The mother liquor is chromatographed on 5 g of acid-washed silica gel; a further quantity of the desired 7-N-acetylamino-4-benzylidene-8-oxo-5-thia-1-azabicyclo[4,2,0]-oct-2-ene-2-carboxylic acid, together with a neutral product which is enriched in the first fractions, is eluted with a 4:1-mixture of benzene and acetone.

EXAMPLE 4

A suspension of 0.0198 g of 4-benzylidene-7-N-phenylacety-amino-8-oxo-5-thia-1-azabicylo[4,2,o]oct-2-ene-2-carboxylic acid in 1.5 ml of methanol, cooled in ice water, is treated with an excess of a 2 percent strength solution of diazomethane in ether, added in portions; the evolution of nitrogen starts immediately and the solid material dissolves. The addition of diazomethane is stopped as soon as the yellow discoloration persists for 2–3 minutes. The volatile constituents are removed in a rotational evaporator and the residue is crystallized by adding a few drops of methanol. The 4-benzylidene-7-N-phenylacetyl-amino-8-oxo-5-thia-1-azabicyclo[4,2,0]oct-2-ene-2-carboxylic acid methyl ester (configuration of 7-amino-cephalosporanic acid) or 2-benzylidene- 7-N-phenylacetyl-amino-Δ³-cephem-4-carboxylic acid methyl ester of the formula

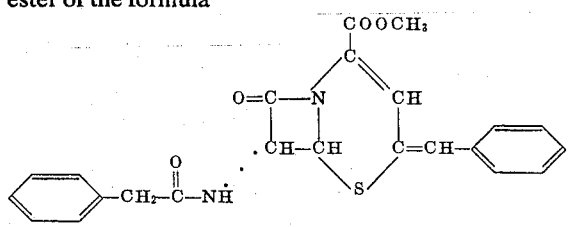

which is thus obtained, melts at 193°–195.5°C; $[\alpha]_D^{20} = -325° \pm 1°$ (c = 1 in chloroform); thin layer chromatogram: Rf = 0.22 (silica gel; in the system hexane/ethyl acetate, 2:1); ultra-violet absorption spectrum: $\lambda_{max}$ 360 mμ (ε = 24,800) and 262 mμ (ε = 8100: shoulder) (in ethanol); $\lambda_{max}$ 3.62 mμ and 250 mμ (shoulder) (in potassium hydroxide/ethanol); and $\lambda_{max}$ 362 mμ and 250–265 mμ (shoulder) (in hydrogen chloride/ethanol); infrared absorption spectrum (in methylene chloride): characteristic bands at 3.06μ, 5.62μ, 5.82μ, 5.95μ, 6.00μ (shoulder), 6.24μ, 6.30μ (shoulder), 6.62μ (shoulder) and 6.65–6.73μ.

EXAMPLE 5

A mixture of 0.1158 g of α-(2-carbo-tert.-butyl-oxy-3,3-dimethyl-7-oxo-4-thia-2,6-diaza-6-bicyclo[3,2,0]heptyl)-α-(isobutyrylmethylene)-acetic acid tert.-butyl ester (isomer A) in 1 ml of pre-cooled trifluoroacetic acid is allowed to stand for 22 hours at −20°C. 5 ml of dry dioxane are added and the mixture, containing the 7-amino-4-isopropylidene-8-oxo-5-thia-1-azabicyclo[4,2,0]oct-2-ene-2-carboxylic acid (configuration of 7-amino-cephalosporanic acid) or 7-amino-2-isopropylidene-Δ³-cephem-4-carboxylic acid, is treated with 0.123 g of phenylacetyl chloride. After allowing the mixture to stand for 3 hours at room temperature, 10 drops of water are added and, after a further hour, the volatile constituents are distilled off under a high vacuum. The oily residue is chromatographed on 10 g of acid-washed silica gel. Phenyl-acetic acid and a small quantity of a neutral product are eluted with a 100:5-mixture of benzene and acetone. The 4-isopropylidene-7-N-phenylacetyl-amino-8-oxo-5-thia-1-aza-bicyclo[4,2,0]oct-2-ene-carboxylic acid (configuration of 7-amino-cephalosporanic acid) or 2-isopropylidene-7-N-phenyl-acetyl-amino-Δ³-cephem-4-carboxylic acid of the formula

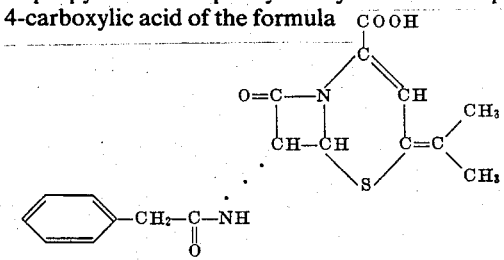

is eluted with a 2:1-mixture of benzene and acetone. After recrystallization from benzene containing a small quantity of acetone it melts at 216°–219°C; ultra-villet absorption spectrum: in ethanol $\lambda_{max}$ 326 mμ; in potassium hydroxide/ethanol, $\lambda_{max}$ 317 mμ; and in hydrogen chloride/ethanol, $\lambda_{max}$ 332 mμ; infrared absorption spectrum (in potassium bromide): characteristic bands at 3.00μ, (shoulder), 3.15–4.35μ, 5.60μ, 5.65μ (shoulder), 5.90μ, 6.04μ, 6.25μ, 6.30μ (shoulder) and 6.45–6.55μ

EXAMPLE 6

A mixture of 0.128 g of isomer A of α-(2-carbo-tert.-butyloxy-3,3-dimethyl-7-oxo-4-thia-2,6-diaza-6-bicyclo-[3,2,0]heptyl)-α-[(4-nitro-phenylacetyl)-methylene]-acetic acid tert.-butyl ester in 1 ml of trifluoroacetic acid is allowed to stand for 44 hours at −20°C. The orange-colored reaction mixture, containing the 7-amino-4-(4-nitrobenzylidene)-8-oxo-5-thia-1-azabicyclo[4,2,0]oct-2-ene-2-carboxylic acid (configuration of 7-amino-cephalosporanic acid) or 7-amino-2-(4-nitro-benzylidene)-Δ³-cephem-4-carboxylic acid, is then diluted with 5 ml of dry dioxane and mixed with a solution of 0.155 g of phenylacetyl chloride in 2 ml of dioxane. After standing for 3 hours at room temperature, 0.5 ml of water is added to the mixture and, after a further 60 minutes at room temperature, the volatile constituents are removed under an oil pump vacuum. The residue is mixed with a few drops of methylene chloride and benzene; and orange-yellow precipitate forms which is filtered off and washed on the filter with a few drops of methylene chloride. The 4-(4-nitro-benzylidene)-7-N-phenylacetyl-amino-8-oxo-5-thia-1-azabicyclo[4,2,0]oct-2-ene-2-carboxylic acid (configuration of 7-amino-cephalosporanic acid) or 2-(4-nitro-benzylidene)-7-N-phenylacetyl-amino-Δ³-cephem-4-carboxylic acid of the formula

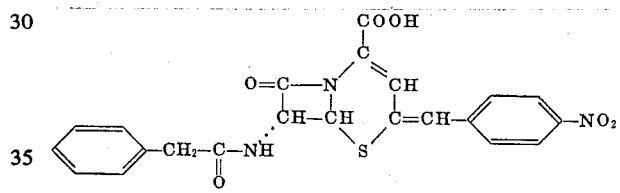

is thus obtained, which after recrystallization from a mixture of acetone and benzene, melts at 202°–204°C; ultraviolet absorption spectrum in ethanol: $\lambda_{max}$ 390 mμ and 273 mμ (weak), in potassium hydroxide/ethanol: $\lambda_{max}$ 398 mμ and about 275 mμ (weak), and in hydrochloric acid/ethanol: $\lambda_{max}$ 392 mμ and about 275 mμ (weak); infrared absorption spectrum (in potassium bromide): characteristic bands at 2.9–4.2μ (broad), 5.60–5.65μ, 5.80–6.0μ, 6.05μ, 6.25μ, 6.60μ, and 7.45μ.

EXAMPLE 7

A solution of 0.023 g of crude 4-(4-nitro-benzylidene)-7-N-phenylacetyl-amino-8-oxo-5-thia-1-azabicyclo[4,2,0]oct-2-ene-2-carboxylic acid (configuration of 7-amino-cephalosporanic acid), obtained from crystallization mother liquor (Example 6), in 1 ml of methanol is treated with an excess of diazomethane in ether and allowed to stand for a few minutes at room temperature, and is then evaporated in a rotatory evaporator.

The residue is purified by means of thin layer chromatography (silica gel plate; 20×10×0.15 cm), the chromatogram being developped with a 2:1-mixture of hexane and ethyl acetate and with ethyl acetate alone. The orange-colored band is extracted with ethyl acetate and the 4-(4-nitrobenzylidene)-7-N-phenylacetyl-amino-8-oxo-5-thia-1-aza-bicyclo-[4,2,0]oct-2-ene-2-carboxylic acid methyl ester (configuration of 7-amino-cephalosporanic acid) or 2-(4-nitro-benzylidene)-7-N-phenylacetylamino-Δ³-cephem-4-carboxylic acid methyl ester of the formula

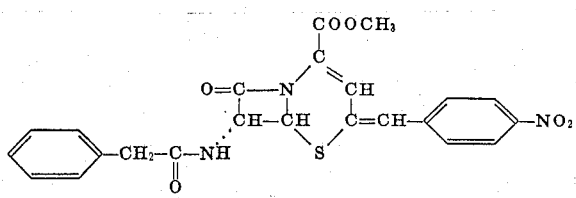

is thus obtained, which crystallizes after prolonged standing, m.p. 185°–187°C (with decomposition); ultra-violet absorption spectrum in ethanol: $\lambda_{max}$ 382 mμ and 278 mμ (shoulder), in potassium hydroxide/ethanol: $\lambda_{max}$ 380 mμ and 278 mμ](shoulder), and in hydrochloric acid/ethanol: $\lambda_{max}$ 378 mμ and 278 mμ (shoulder); infrared absorption spectrum (in methylene chloride): characteristic bands at 3.03μ, 5.60μ, 5.81μ, 5.95μ, 6.24–6.30μ, 6.60–6.65μ, 6.70μ (shoulder) and 7.46μ.

EXAMPLE 8

A solution of 0.12 g of the isomer A of α-(2-carbo-tert.-butyloxy-3,3-dimethyl-7-oxo-4-thia-2,6-diaza-6-bicyclo[3,2,0]heptyl)-α-[(4-methoxy-phenylacetyl)-methylene]-acetic acid tert.-butyl ester in 1 ml of pre-cooled trifluoro-acetic acid is allowed to stand for 2 hours at −20°C. The reaction mixture, containing the 7-amino-4-(4-methoxybenzyli-dene)-8-oxo-5-thia-1-azabicyclo[4,2,0oct-2-ene-2-carboxylic acid (configuration of 7-amino-cephalosporanic acid) or 7-amino-2-(4-methoxybenzyliden-Δ³-cephem-4-carboxylic acid, is mixed with 5 ml of dioxane and treated with a solution of 0.154 g of phenylacetyl chloride in 2 ml of dry dioxane. After 3 hours at room temperature, 10 drops of water are added and the solution is allowed to stand for a further hour. The volatile constituents are then evaporated off under a high vacuum and the oily residue is chromatographed on 10 g of acid-washed silica gel (column). The excess of phenylacetic acid is eluted with benzene, containing 5 percent of acetone, together with a yellow-colored product. The 4-(4-methoxy-benzylidene)-7-N-phenylacetyl-amino-8-oxo-5-thia-1-aza-bicyclo[4,2,0]oct-2-ene-2-carboxylic acid (configuration of 7-amino-cephalosporanic acid) or 2-(4-methoxy-benzylidene)-7-N-phenylacetylamino-Δ³-cephem-4-carboxylic acid of the formula

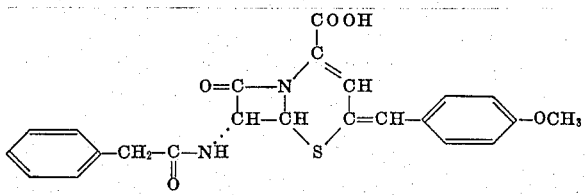

is eluted with a 2:1-mixture of benzene and acetone and melts as a yellow product at 201°–203°C after crystallization from a mixture of acetone and benzene; ultra-violet absorption spectrum in ethanol: $\lambda_{max}$ 366 mμ and 275 mμ (shoulder), in potassium hydroxide/ethanol: $\lambda_{max}$ 356 mμ and 272 mμ (shoulder), and in hydrochloric acid/ethanol: $\lambda_{max}$ 372 mμ and 277 mμ (shoulder); infrared absorption spectrum (in potassium bromide): characteristic bands at 2.95μ (shoulder), 3.01–4.40μ–5.70μ, 5.75μ (inflection), 6.04–6.10μ, 6.28μ and 6.61μ.

EXAMPLE 9

A mixture of 0.0052 g of 4-(4-methoxybenzylidene)-7-N-phenylacetyl-amino-8-oxo-5-thia-1-azab-icyclo[4,2,0]-oct-2-ene-2-carboxylic acid (configuration of 7-amino-cephalosporanic acid) in 2 ml of methanol is mixed with 2 ml of a 2 percent solution of diazomethane in ether. The mixture is allowed to stand for 3 minutes at room temperature, the volatile constituents are then evaporated off and the residue is crystallized from a mixture of methanol and ether. The 4-(4-methoxy-benzylidene)-7-N-phenylacetyl-amino-8-oxo-5-thia-1-azabicyclo-[4,2,0]oct-2-ene-2-carboxylic acid methyl ester (configuration of 7-amino-cephalosporanic acid) or 2-(4-methoxy-benzyli-dene)-7-N-phenylacetylamino-Δ³-cephem-4-carboxylic acid methyl ester of the formula

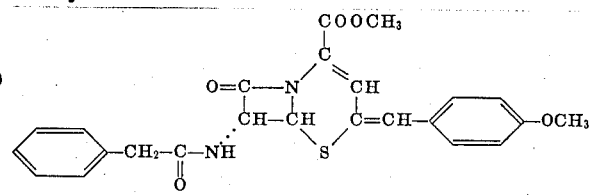

thus obtained melts at 210°–211°C; ultra-violet absorption spectrum in ethanol: $\lambda_{max}$ 378 mμ and 278 mμ (shoulder), in potassium hydroxide/ethanol: $\lambda_{max}$ 376 mμ and 278 mμ (shoulder) and in hydrochloric acid/ethanol: $\lambda_{max}$ max 374 mμ; infrared absorption spectrum (in methylene chloride): characteristic bands at 3.02μ, 5.60μ, 5.80μ, 5.91μ, 6.26μ, 6.60–6.65μ and 7.12μ.

EXAMPLE 10

A solution of 0.232 g of the isomer A of α-(2-carbo-tert.-butyloxy-3,3-dimethyl-7-oxo-4-thia-2,6-diaza-6-bicyclo[3,2,0]heptyl)-α-[(4-chlorophenylacetyl)-methylene]-acetic acid tert.-butyl ester in 2 ml of trifluoroacetic acid is allowed to stand for 21 hours at −20°C. After a further 20 minutes at room temperature the solution is mixed with 15 ml of dry dioxane and 0.25 g of freshly distilled phenyl-acetyl chloride are added to the mixture, which contains the 7-amino-4-(4-chlorobenzylidene)-8-oxo-5-thia-1-azabicyclo-[4,2,0]oct-2-ene-2-carboxylic acid (configuration of 7-amino-cephalosporanic acid) or 7-amino-2-(4-chlorobenzylidene)-Δ³-cephem-4-carboxylic acid. The reaction solution is kept for 3 hours at room temperature and is then mixed with 0.3 ml of water and left to stand for 1 hour at room temperature. The volatile constituents are removed under reduced pressure (oil pump, room temperature) and the residue is chromatographed on 10 g of acid-washed silica gel. Phenylacetic acid and a small quantity of a neutral by-product are eluted with 250 ml of a 100:5-mixture of benzene and acetone. The 4-(4-chlorobenzylidene)-7-N-phenylacetyl-amino-8-oxo-5-thia-1-azabicyclo[4,2,0]oct-2-ene-2-carboxylic acid (configuration of 7-amino-cephalosporanic acid) or 2-(4-chlorobenzylidene)-7-N-phenylacetyl-amino-Δ³-cephem-4-carboxylic acid of the formula

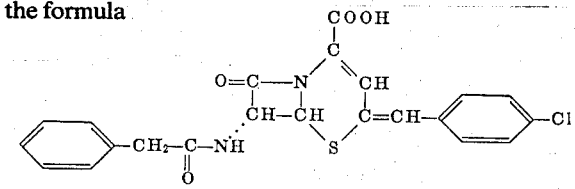

is eluted with a 2:1-mixture of benzene and acetone and crystallizes in the form of yellowish crystals, m.p. 226°–227°C, on adding a little benzene and ethyl acetate; ultra-violet absorption spectrum: $\lambda_{max}$ 359 m$\mu$ (in ethanol); $\lambda_{max}$ 351 m$\mu$ (in potassium hydroxide/ethanol) and $\lambda_{max}$ 362 m$\mu$ (in hydrogen chloride/ethanol); infrared absorption spectrum (in potassium bromide): characteristic bands at 2.85°–4.30 $\mu$ (broad), 3.02$\mu$, 5.62$\mu$, 5.88$\mu$, 6.15$\mu$, 6.26$\mu$, 6.55$\mu$, and 6.70$\mu$.

EXAMPLE 11

A solution of 0.3285 g of the isomer A (trans) of α-(2-carbo-tert.-butyloxy-3,3-dimethyl-7-oxo-4-thia-2,6-diaza-6-bicyclo[3,2,0]heptyl)-α-(cyclohexylacetyl-methylene)-acetic acid tert.-butyl ester in 2.3 ml of precooled trifluoroacetic acid is left to stand for 16½ hours at −20°C. The reaction mixture, containing the 7-amino-4-cyclohexyl-methylene-8-oxo-5-thia-1-azabicyclo[4,2,0]oct-2-ene-2-car-boxylic acid (configuration of 7-amino-cephalosporanic acid) or 7-amino-2-cyclohexylmethylene-$\Delta^3$-cephem-4-carboxylic acid, is mixed with 0.13 g of phenylacetyl chloride in 14 ml of dioxane and the mixture is kept at room temperature for 3 hours. After a further hour, it is treated with 0.3 ml of water, the volatile constituents are removed under reduced pressure (oil pump; room temperature) and the residue is chromatographed on 10 g of acid-washed silica gel. Phenyl-acetic acid and a small amount of neutral substances are removed with a 100:5-mixture of benzene and acetone and the 4-cyclohexylmethylene-7-N-phenylacetylamino-8-oxo-5-thia-1-azabicyclo[4,2,0]-oct-2-ene-2-carboxylic acid (configuration of 7-amino-cephalosporanic acid) or 2-cyclohexylmethylene-7-N-phenylacetyl-amino-$\Delta^3$-cephem-4-carboxylic acid of the formula

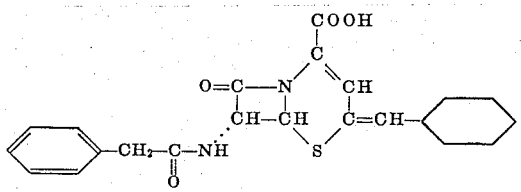

is eluted with a 2:1-mixture of benzene and acetone; after crystallization from benzene the material melts at 120°–121°C; ultra-violet absorption spectrum:$\lambda_{max}$317 m$\mu$ (in ethanol), $\lambda_{max}$309 m$\mu$ (in potassium hydroxide/ethanol) and $\lambda_{max}$323 m$\mu$ (in hydrogen chloride/ethanol); infrared absorption spectrum (in methylene chloride): characteristic bands at 2.96$\mu$, 3.45$\mu$, 3.53$\mu$, 2.85–4.3$\mu$ (broad), 5.61$\mu$, 5.70–5.85$\mu$ (broad), 5.94$\mu$, 6.05$\mu$ (shoulder), 6.24$\mu$, and 6.60–6.70$\mu$

EXAMPLE 12

A mixture of 0.4 g of α-(2-carbo-tert.-butyloxy-3,3-dimethyl-7-oxo-4-thia-2,6-diaza-6-bicyclo[3,2,0]heptyl)-α-(phenylacetylmethylene)-acetic acid tert.-butyl ester in 4 ml of trifluoroacetic acid is left to stand for 20 hours at −20°C; the trifluoroacetic acid is removed under reduced pressure (oil pump) and the orange-colored residue, containing the 7-amino-4-benzylidene-8-oxo-5-thia-1-azabicyclo[4,2,0]oct-2-ene-2-carboxylic acid (configuration of 7-amino-cephalosporanic acid) or 7-amino-2-benzyliden-$\Delta^3$-cephem-4-carboxylic acid, is mixed with 4 ml of a solution, cooled to −15°C, of the mixed anhydride of cyanoacetic acid and trichloracetic acid in methylene chloride (the mixed anhydride can be obtained as follows: a mixture of 1.45 g of cyanoacetic acid in 3 ml of methylene chloride is mixed with 1.1 ml of triethylamine and the resulting solution, cooled to −5°C, is added with stirring to a solution of 1.45 g of trichloroacetyl chloride in 3 ml of methylene chloride kept at −15°C. A suspension is thus obtained, which is adjusted to a volume of 14 ml with methylene chloride at −15°C and used in this form). The reaction mixture is treated with 2 ml of a solution of 0.3 ml of acetic acid and 1 ml of triethylamine in 6 ml of methylene chloride, stirred for 2 hours at room temperature and then diluted with 30 ml of ethyl acetate. The mixture is washed with a concentrated sodium chloride solution in water, containing hydrochloric acid (15 ml of the sodium chloride solution contain 1.5 ml of 1N hydrochloric acid) and with a concentrated aqueous sodium chloride solution, dried over sodium sulphate and evaporated under reduced pressure. The residue is mixed with about 1 ml of ethyl acetate and carefully diluted with ether and then left to stand. The crystalline 4-benzylidene-7-N-cyanoacetylamino-8-oxo-5-thia-1-azabicyclo[4,2,0]oct-2-ene-2-carboxylic acid (configuration of 7-amino-cephalosporanic acid) or 2-benzylidene-7-N-cyanoacetyl-amino-$\Delta^3$-cephem-4-carboxylic acid of the formula

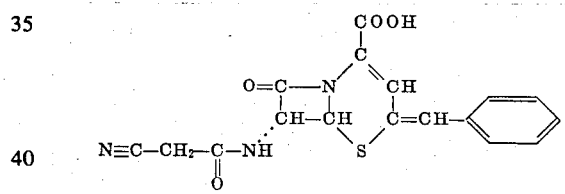

is thus obtained, m.p. 215°–216° (with decomposition).

The residue from the mother liquor is chromatographed on 20 g of acid-washed silica gel, with neutral constituents, cyanoacetic acid and trichloroacetic acid being eluted with a 100:5-mixture of benzene and acetone and a further quantity of the desired product being eluted with a 2:1-mixture of benzene and acetone; this product melts at 225°–227°C (decomposition) after crystallization from ethyl acetate and ether; ultra-violet absorption spectrum: $\lambda_{max}$ 353 m$\mu$ and 240–265 m$\mu$ (broad shoulder) (in ethanol), $\lambda_{max}$ 346 m$\mu$ and 248 m$\mu$ (shoulder) (in potassium hydroxide/ethanol) and $\lambda_{max}$ 356 m$\mu$ and 247 m$\mu$ (shoulder) (in hydrogen chloride/ethanol); infrared absorption spectrum (in potassium bromide): characteristic bands at 2.90–4.20$\mu$, 4.42$\mu$, 5.60$\mu$, 5.85–5.90$\mu$, 5.98$\mu$, 6.22$\mu$, and 6.45$\mu$.

EXAMPLE 13

A solution of 0.023 g of 4-benzylidene-7-N-cyanoacetylamino-8-oxo-5-thia-1-azabicyclo[4,2,0]oct-2-ene-2-carboxylic acid (configuration of 7-amino-cephalosporanic acid) in about 2 ml of methanol is treated with a large excess of a 2 percent solution of diazomethane in ether. After standing for 2 minutes at room temperature, the excess of the diazomethane and the solvents are evaporated and the crystalline residue is purified by means of preparative thin layer chromatography on a silica gel plate, using a 95:5-mixture of chloroform and methanol. The 4-benzylidene-7-cyanoacetylamino-8-oxo-5-thia-1-azabicyclo[4,2,0]oct-2-ene-2-carboxylic acid methyl ester (configuration of 7-amino-cephalosporanic acid) or 2-benzylidene-7-N-cyanoacetyl-amino-$\Delta^3$-cephem-4-carboxylic acid methyl ester of the formula

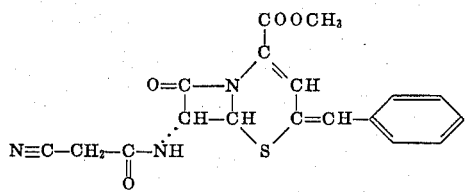

is obtained in a crystalline form, m.p. 232°–234°C; ultra-violet absorption spectrum: $\lambda_{max}$ 356 m$\mu$ and 247–265 m$\mu$ (broad shoulder) (in ethanol), $\lambda_{max}$ 364 m$\mu$ and 253 m$\mu$ (in potassium hydroxide/ethanol) and $\lambda_{max}$ 364 m$\mu$ and 254 m$\mu$ (on acidifying the alkaline sample with hydrogen chloride/ethanol); infrared absorption spectrum (in mineral oil): characteristic bands at 3.1$\mu$, 5.60–5.64$\mu$, 5.80$\mu$, 5.98$\mu$, 6.20, 6.45$\mu$, and 6.50$\mu$ (shoulder).

EXAMPLE 14

A mixture of 0.328 g of $\alpha$-(2-carbo-tert.-butyl-oxy-3,3-dimethyl-7-oxo-4-thia-2,6-diaza-6-bicyclo[3,2,0]heptyl)-$\alpha$-(4-nitrophenylacetyl-methylene)-acetic acid tert.-butyl ester and 3 ml of trifluoroacetic acid is left to stand at −20°C for 44 hours. The trifluoroacetic acid is removed under reduced pressure (oil pump) and the residue, containing the 7-amino-4-(4-nitrobenzylidene)-8-oxo-5-thia-1-azabicyclo[4,2,0]2-ene-2-carboxylic acid (configuration of 7-amino-cephalosporanic acid) or 7-amino-2-(4-nitrobenzylidene)-$\Delta^3$-cephem-4-carboxylic acid, is treated with 3 ml of a solution of a mixed anhydride of cyanoacetic acid and trichloroacetic acid in methylene chloride (for manufacture, see Example 12), followed by 1.5 ml of a solution of 0.3 ml of acetic acid and 1 ml of triethylamine in 6 ml of methylene chloride. The reaction mixture is kept at room temperature for 2 hours and is then diluted with 15 ml of ethyl acetate and washed with concentrated aqueous sodium chloride containing hydrochloric acid (10 ml of the sodium chloride solution contain 1 ml of 1N hydrochloric acid) and with a concentrated aqueous sodium chloride solution, dried over sodium sulphate and evaporated under reduced pressure. The residue is chromatographed on 10 g of acid-washed silica gel. The excess cyanoacetic acid and trichloroacetic acid and an orange-colored neutral constituent are eluted with a 100:5-mixture of benzene and acetone, and the amorphous yellowish-orange 7-N-cyanoacetyl-amino-4-(4-nitrobenzylidene)-8-oxo-5-thia-1-azabicyclo[4,2,0]2-ene-2-carboxylic acid (configuration of 7-amino-cephalosporanic acid) or 7-N-cyanoacetyl-amino-2-(4-nitro-benzylidene)-$\Delta^3$-cephem-4-carboxylic acid of the formula

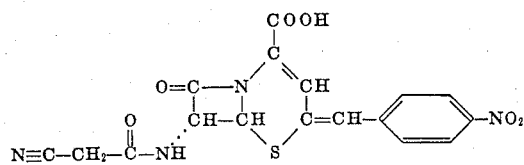

is eluted with a 2:1-mixture of benzene and acetone; ultra-violet absorption spectrum: $\lambda_{max}$ 388 m$\mu$ and 275 m$\mu$ (in ethanol), $\lambda_{max}$ 453 m$\mu$ and 263 m$\mu$ (in potassium hydroxide/ethanol), and $\lambda_{max}$ 420 m$\mu$ and 263 m$\mu$ (after acidifying the alkaline sample with hydrogen chloride/ethanol); infrared absorption spectrum (in potassium bromide): characteristic bands at 2.8–4.2$\mu$, 5.60–5.65$\mu$, 5.80–6.07$\mu$, 6.25$\mu$, 6.60$\mu$, and 7.45$\mu$.

EXAMPLE 15

A solution of 0.058 g of the isomer A of $\alpha$-(2-carbotert.-butyloxy-3,3-dimethyl-7-oxo-4-thia-2,6-diaza-6-bicyclo[3,2,0]heptyl)-$\alpha$-(phenylacetylmethylene)-acetic acid tert.-butyl ester in 1.5 ml of acetic acid, containing 0.015 g of p-toluenesulphonic acid, is left to stand for 18 hours at room temperature and then diluted with 12 ml of dioxane. The resulting solution is mixed with 0.08 g of phenylacetyl chloride and after 3 hours with 0.5 ml of water. The reaction mixture is left to stand for 1 hour at room temperature, the volatile constituents are then evaporated under a high vacuum and at room temperature, and the residue is chromatographed on 10 g of acid-washed silica gel. The excess of phenylacetic acid and a neutral fraction, containing a small quantity of 4-benzylidene-7-N-phenylacetyl-amino-8-oxo-5-thia-1-azabicyclo-[4,2,0]oct-2-ene-2-carboxylic acid tert.-butyl ester (configuration of 7-amino-cephalosporanic acid) or 2-benzylidene-7-N-phenylacetyl-amino-$\Delta^3$-cephem-4-carboxylic acid tert.-butyl ester of the formula

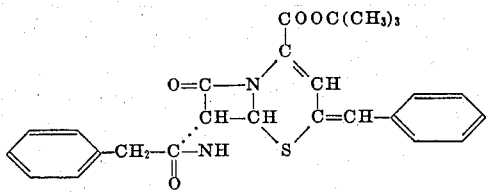

are eluted with a 100:5-mixture of benzene and acetone; ultra-violet absorption spectrum of the ester: $\lambda_{max}$ 356 m$\mu$ (in ethanol, potassium hydroxide/ethanl or hydrogen chloride/ethanol). The 4-benzylidene-7-N-phenylacetyl-amino-8-oxo-5-thia-1-azabicyclo[4,2,0]oct-2-ene-2-carboxylic acid, which is identical with the product of the process described in example 2, is eluted with a 2:1-mixture of benzene and acetone.

EXAMPLE 16

A mixture of 0.35 g of the isomer A of $\alpha$-(2-carbotert.-butyloxy-3,3-dimethyl-7-oxo-4-thia-2,6-diaza-6-bicyclo[3,2,0]heptyl)-$\alpha$-(isobutyrylmethylene)-acetic acid tert.-butyl ester and 2.8 ml of trifluoroacetic acid is allowed to stand at −20°C for 24 hours; the trifluoroacetic acid is then distilled off under a high vacuum at room temperature. The residue, which contains 7-amino-4-isopropylidene-8-oxo-5-thia-1-azabicyclo[4,2,0]oct-2-ene-2-carboxylic acid (configuration of 7-amino-cephalosporanic acid) or 7-amino-2-isopropylidene-$\Delta^3$-cephem-4-carboxylic acid, is treated with 4 ml of a pre-cooled solution of the mixed anhydride of cyanoacetic acid and trichloroacetic acid in methylene chloride (for preparation, see Example 12), and then treated with 2 ml of a solution of 0.3 ml of acetic acid and 1 ml of triethylamine in 6 ml of methylene chloride. The resulting solution is allowed to stand at room temperature for 2 hours and is then diluted with 40 ml of ethyl acetate. The organic solution is washed with 15 ml of water, 2 ml of 2N-hydrochloric acid and twice with a saturated aqueous sodium chloride solution. The aqueous phases are extracted with a small quantity of ethyl acetate, and the combined organic solutions are dried over sodium sulfate, then evaporated. The residue is treated with a mixture of benzene and acetone; there is obtained as a solid product the 7-N-cyanoacetyl-amino-4-isopropylidene-8-oxo-5-thia-1-azabicyclo[4,2,0]oct-2-ene-2-carboxylic acid (configuration of 7-amino-cephalosporanic acid) or 7-N-cyanoacetyl-amino-2-isopropylidene-Δ³-cephem-4-carboxylic acid of the formula

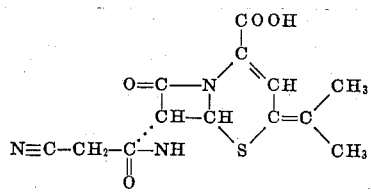

m.p. above 275°C; ultra-violet absorption spectrum: in ethanol $\lambda_{max}$ 327 m$\mu$; in ethanol/potassium hydroxide $\lambda_{max}$ 320 m$\mu$; and in ethanol/hydrogen chloride $\lambda_{max}$ 333 m$\mu$; infrared absorption spectrum (potassium bromide): characteristic bands at 2.90–4.20$\mu$, 5.6$\mu$, 5.75$\mu$ (shoulder), 5.98$\mu$, 6.22–6.40$\mu$, and 6.45$\mu$.

The mother liquor is purified on 10 g of acid-washed silica gel; the column is prewashed with a 100:5-mixture of benzene and acetone, and one obtains with a 2:1-mixture of benzene and acetone, after treatment with a few drops of benzene and acetone, another quantity of 7-N-cyanoacetyl-amino-4-isopropylidene-8-oxo-5-thia-1-azabicyclo[4,2,0]oct-2-ene-2-carboxylic acid.

EXAMPLE 17 oct-

A mixture of 0.42 g of the isomer A of α-(2-carbo-tert.-butyloxy-3,3-dimethyl-7-oxo-4-thia-2,6-diaza-6-bicyclo[3,2,0]heptyl)-α-[(4-chlorophenylacetyl)-methylene]-acetic acid tert.-butyl ester in 3.1 ml of trifluoroacetic acid is allowed to stand at −20°C for 23 hours; the trifluoroacetic acid is then distilled off at room temperature under a high vacuum. The residue, which contains the 7-amino-4-(4-chlorobenzylidene)-8-oxo-5-thia-1-azabicyclo[4,2,0]2-ene-2-carboxylic acid (configuration of 7-amino-cephalosporanic acid) or 7-amino-2-(4-chlorobenzylidene)-Δ³-cephem-4-carboxylic acid, is treated with 4 ml of a pre-cooled solution of the mixed anhydride of cyanoacetic acid and trichloroacetic acid in methylene chloride (for preparation, cf. Example 12), then treated with 2 ml of a solution of 0.3 ml of acetic acid and 1 ml of triethylamine in 6 ml of methylene chloride. The solution is allowed to stand at room temperature for 2 hours, then diluted with 40 ml of ethyl acetate, and washed with 15 ml of water, with 2 ml of 2N-hydrochloric acid, and twice with a concentrated aqueous sodium chloride solution; the aqueous solutions are each extracted with a small quantity of ethyl acetate. The combined organic solutions are dried over sodium sulfate and evaporated; the residue is treated with 3 ml of ethyl acetate and 4 ml of ether, and there is obtained in this manner the 4-(4-chlorobenzylidene)-7-N-cyanoacetyl-amino-8-oxo-5-thia-1-aza-bicyclo[4,2,0]oct-2-ene-2-carboxylic acid (configuration of 7-amino-cephalosporanic acid) or 2-(4-chlorobenzylidene)-7-N-cyanoacetyl-amino-Δ³-cephem-4-carboxylic acid of the formula

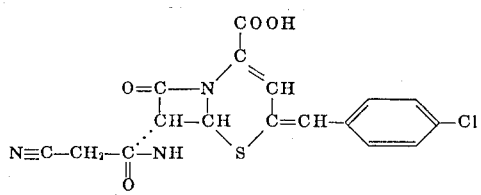

melting at 252°–253°C; ultra-violet absorption spectrum: in ethanol $\lambda_{max}$ 358 m$\mu$; in ethanol/potassium hydroxide $\lambda_{max}$ 365 m$\mu$; and after acidification of the ethanol/potassium hydroxide sample with hydrogen chloride $\lambda_{max}$ 369 m$\mu$; infrared absorption spectrum (potassium bromide): characteristic bands at 2.87–4.30$\mu\mu$, 5.65$\mu$ (shoulder), 5.85$\mu$ (shoulder), 6.00$\mu$, 6.39–6.42$\mu$, 6.47$\mu$ (shoulder) and 6.57–6.62$\mu$ (shoulder).

The residue from the mother liquor is chromatographed on 10 g of acid-washed silica gel. The column is pre-washed with a 95:5-mixture of benzene and ethyl acetate, and with a 2:1-mixture of benzene and ethyl acetate, another quantity of 4-(4-chlorobenzylidene)-7-N-cyanoacetyl-amino-8-oxo-5-thia-1azabicyclo[4,2,0]oct-2-ene-2-carboxylic acid is eluted which is purified by crystallization from a mixture of ethyl acetate and ether.

EXAMPLE 18

A mixture of 0.367 g of the isomer A of α-(2-carbo-tert.-butyloxy-3,3-dimethyl-7-oxo-4-thia-2,6-diaza-6-bicyclo[3,2,0]heptyl)-α-[(3-phenylpropionyl)-methylene]-acetic acid tert.-butyl ester in 3 ml of trifluoroacetic acid is allowed to stand at −20°C for 22 hours, after which the trifluoroacetic acid is distilled off at room temperature under a high vacuum. The residue, which contains the 7-amino-8-oxo-4-(2-phenyl-1,1-ethylidene)-5-thia-1-azabicyclo[4,2,0]oct-2-ene-2-carboxylic acid (configuration of 7-amino-cephalos-poranic acid) or 7-amino-2-(2-phenyl-1,1-ethylidene)-Δ³-cephem-4-carboxylic acid, is treated with 4 ml of a pre-cooled solution of the mixed anhydride of cyanoacetic acid and trichloroacetic acid in methylene chloride (for preparation, cf. Example 12), then treated with 2 ml of a solution of 0.3 ml of acetic acid and 1 ml of triethylamine in 6 ml of methylene chloride. The batch is allowed to stand at room temperature for 2 hours, then diluted with 40 ml of ethyl acetate, and the mixture is washed with 15 ml of water, with 2 ml of 2N hydrochloric acid, and twice with a saturated aqueous sodium chloride solution; the aqueous solutions are each extracted with ethyl acetate. The combined organic solutions are dried over sodium sulfate and evaporated. The 7-N-cyanoacetylamino-4-(2-phenyl-1,1-ethylidene)-8-oxo-5-thia-1-azabicyclo[4,2,0]oct-2-ene-2-carboxylic acid (configuration of 7-amino-cephalosporanic acid) or 7-N-cyanoacetyl-amino]2-(2-phenyl-1,1-ethyli-dene)-Δ³-cephem-4-carboxylic acid of the formula

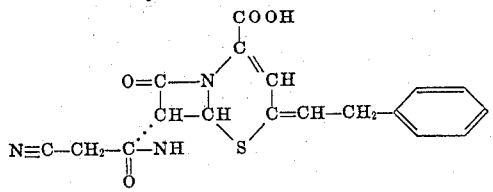

is obtained by triturating the residue with benzene, m.p. 217°–218°C (with decomposition); ultra-violet absorption spectrum: in ethanol and ethanol/hydrogen chloride $\lambda_{max}$ 323 m$\mu$, and in ethanol/potassium hydroxide $\lambda_{max}$ ≈315 m$\mu$; IR absorption spectrum (potassium bromide): characteristic bands at 2.85–4.20$\mu\mu$, 5.62$\mu$ (shoulder), 5.81$\mu$ (shoulder), 5.97$\mu$, 6.05$\mu$ (shoulder), 6.25$\mu$, and 6.40$\mu$.

The residue from the mother liquor is chromatographed on 10 g of acid-washed silica-gel. With a 2:1-mixture of benzene and acetone, cyanoacetic acid and trichloroacetic acid are washed out, and then a further quantity of 7-N-cyano-acetyl-amino-4-(2-phenyl-1,1-ethylidene)-8-oxo-5-thia-1-azabicyclo[4,2,0]oct-2ene-2-carboxylic acid is eluted with a 2:1-mixture of benzene and acetone. The product is purified by trituration with benzene.

EXAMPLE 19

A solution of 0.133 g of the isomer A of α-(2-carbo-tert.-butyloxy-3,3-dimethyl-7-oxo-4-thia-2,6-diaza-6-bicyclo[3,2,0]heptyl)-α-(cyclopropylcarbonyl-methylene)-acetic acid tert.-butyl ester in 3 ml of precooled trifluoroacetic acid is allowed to stand at −20°C for 6 days, then for 1 day at +5°C. The mixture is diluted with 8 ml of dioxane, and treated with about 0.16 g of phenylacetyl chloride in 2 ml of dioxane. It is kept at room temperature for 3 hours and then treated with 0.5 ml of water, and allowed to stand at room temperature for another hour. The volatile constituents are removed under reduced pressure at room temperature, and the dark-colored residue is dissolved in 4 ml of dioxane and 1 ml of water. The solution is allowed to stand at room temperature for another 60 minutes before the solvents are distilled off under reduced pressure. The residue is purified on 10 g of acid-washed silica gel (column). With a 100:5-mixture of benzene and acetone, neutral constituents and phenyl-acetic acid are washed out. With a 2:1-mixture of the same solvents, an amorphous, brown fraction is eluted and treated in 4 ml of dioxane with 2 drops of triethylamine. The resulting solution is lyophilized and the resulting triethylammonium salt of 4-(3-hydroxy-1,1-propylidene)-7-N-phenylacetyl-amino-8-oxo-5-thia-1-azabicyclo[4,2,0]oct-2-ene-2-carboxylic acid (configuration of 7-amino-cephalosporanic acid) or 2-(3-hydroxy-1,1-propylidene)-7-N-phenylacetyl-amino-Δ³-cephem-4-carboxylic acid of the formula

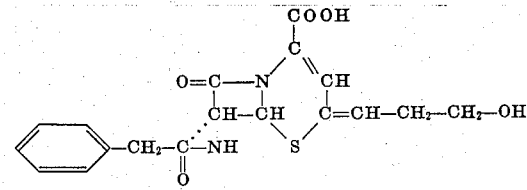

is dissolved in water, filtered together with an active carbon preparation (carboraffin), and lyophilized again. The syrupy triethylamine salt is soluble in chloroform and water; ultra-violet absorption spectrum; in ethanol$\lambda_{max}$ 307 m$\mu$, and in ethanol/hydrogen chloride $\lambda_{max}$ 317 m$\mu$; infrared absorption spectrum (in chloroform): characteristic bands at 2.90–4.30$\mu$, 5.60–5.65$\mu$, 5.75$\mu$ (shoulder), 5.95$\mu$, 6.02$\mu$ (shoulder) and 6.16–6.30$\mu$ (broad).

EXAMPLE 20

A mixture of 0.2 g of the isomer A (trans) of α-(2-carbo-tert.-butyloxy-3,3-dimethyl-7-oxo-4-thia-2,6-diaza-6-bicyclo[3,2,0]heptyl)-α-(phenylacetyl-methylene)-acetic acid acid tert.-butylester in 1.5 ml of trifluoroacetic acid is allowed to stand for 19 hours at −20°C. The trifluoroacetic acid is evaporated at room temperature, finally under high vacuum. The residue, containing the 7-amino-4-benzylidene-8-oxo-5-thia-1-azabicyclo[4,2,0]oct-2-ene-2-carboxylic acid (configuration of the 7-amino-cephalosporanic acid) or 7-amino-2-benzylidene-Δ³-cephem-4-carboxylic acid, is dissolved in 2 ml of methylene chloride containing 0.11 ml of triethylamine.

A solution of 0.052 ml of isobutyl chloroformate in 0.5 ml tetrahydrofuran is treated at −10°C with 0.101 g of D-N-carbo-tert.-butyloxy-phenylglycine and 0.055 ml of triethylamine in 2 ml of tetrahydrofuran and after 10 minutes, the previously mentioned solution of cyclization product is added. The resulting mixture is allowed to stand for 1 hour at 10°C and for another hour at room temperature. The volatile components are then distilled off under reduced pressure, the residue is dissolved in 25 ml of ethyl acetate and extracted three times with water. The combined aqueous extracts are acidified with 2N hydrochloric acid to pH 3 and extracted with ethyl acetate. The organic solution is dried over sodium sulfate and evaporated under reduced pressure. The residue is chromatographed on 3 g of acid-washed silicagel, a mixture of benzene and ethyl acetate with a gradual increase of ethyl acetate from 2 percent to 50 percent being used as mobile phase. One thus elutes first D-phenylglycine and then the non-crystalline 4-benzylidene -7-N-(N-carbo-tert.-butyl-oxy-D-phenylglycyl)-amino-8-oxo-5-thia-1-azabicyclo[4,2,0]oct-2-ene-2-carboxylic acid (configuration of the 7-amino-cephalosporanic acid) or 2-benzylidene-7-N-(N-carbo-tert.-butyl-oxy-D-phenylglycyl)-amino-Δ³-cephem-4-carboxylic acid, ultra-violet absorption spectrum: in ethanol $\lambda_{max}$ 352 m$\mu$, in ethanol/potassium hydroxide $\lambda_{max}$ 347 m$\mu$, and in ethanol/hydrogen chloride $\lambda_{max}$ 359 m$\mu$; infrared absorption spectrum (in methylene chloride); characteristic bands at 2.95$\mu$, 2.80–4.40$\mu$, 5.60$\mu$, 5.80$\mu$ (shoulder), 5.85–5.95$\mu$, 6.05$\mu$ (shoulder), 6.20–6.30$\mu$ and 6.65–6.75$\mu$.

A further amount of this product can be isolated from the residue of the first ethyl acetate solution; it contains a small amount of the 4-benzylidene-7-N-(N-carbo-tert.-butyloxy-D-phenylglycyl)-amino-8-oxo-5-thia-1-azabicyclo-[4,2,0]oct-2-ene-2-carboxylic acid tert.-butyl ester (configuration of 7-amino-cephalosporanic acid) or 2-benzylidene-7-N-(N-carbo-tert.-butyloxy-D-phenylglycyl)-amino-Δ³-cephem-4-carboxylic acid tert.-butylester.

A mixture of 0.0304 g of 4-benzylidene-7-N-(N-carbo-tert.-butyloxy-D-phenylglycyl)-amino-8-oxo-5-thia-1-aza-bicyclo[4,2,0]oct-2-ene12-carboxylic acid and 0.4 ml of formic acid (99 percent) is allowed to stand for 2-1/2 hours at room temperature. The formic acid is then removed under reduced pressure (water-bath), and the solid residue is dried at 50°C under high vacuum (diffusion pump). One thus obtains the non-crystalline 4-benzylidene-7-N-(D-phenylglycyl)-amino-8-oxo-5-thia-1-azabicyclo[4,2,0]oct-2-ene-2-carboxylic acid (configuration of the 7-amino-cephalosporanic acid) or 2-benzylidene-7-N-(D-phenylglycyl)-amino-$\Delta^3$-cepehm-4-carboxylic acid of the formula

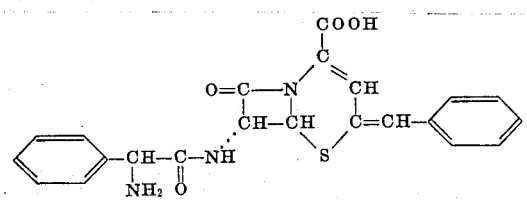

which can be obtained in the form of a salt, including an inner salt; ultra-violet absorption spectrum: in ethanol $\lambda_{max}$ 347 m$\mu$, in ethanol/potassium hydroxide $\lambda_{max}$ 346 m$\mu$, and in ethanol/hydrogen chloride $\lambda_{max}$ 357 m$\mu$; infrared absorption spectrum (potassium bromide): characteristic bands at 2.95–4.30$\mu$, 5.60–5.72$\mu$, 5.90–6.00$\mu$, 6.25–6.65$\mu$, and 6.70$\mu$ (shoulder).

EXAMPLE 21

A solution of 0.255 g of the isomer A (trans) of $\alpha$-(2-carbo-tert.-butyloxy-3,3-dimethyl-7-oxo-4-thia-2,6-diaza-6-bicyclo[3,2,0]heptyl)-$\alpha$-[(4-chlorobutyryl)-methylene]-acetic acid tert.-butyl ester in 5 ml of pre-cooled trifluoroacetic acid is allowed to stand at −20°C for 20 hours. A total of 4 ml of trifluoroacetic acid is distilled off and 15 ml of dioxane and 0.25 g of phenylacetyl chloride is added to the solution containing the 7-amino-4-(-chloro-1,1-propylidene)-8-oxo-5-thia-1-azabicyclo[4,2,0]oct-2-ene-2-carboxylic acid (configuration of 7-amino-cephalosporanic acid) or 7-amino-2-(3-chloro-1,1-propylidene)-$\Delta^3$-cephem-4-carboxylic acid. The reaction mixture is allowed to stand at room temperature for 3 hours and treated with 0.1 ml of water, and, after one additional hour, evaporated under reduced pressure. The residue is chromatographed on 10 g of acid-washed silica gel. With a 19:1-mixture of benzene and acetone, phenyl acetic acid and some neutral components are washed out and with a 2:1-mixture of benzene and acetone, the 4-(3-chloro-1,1-propylidene)-7-N-phenylacetyl-amino-8-oxo-5-thia-1-azabicyclo-[4,2,0]oct-2-ene-2-carboxylic acid (configuration of 7-amino-cephalosporanic acid) or 2-(3-chloro-1,1-propylidene)-7-N-phenylacetyl-amino-$\Delta^3$-cephem-4-carboxylic acid of the formula

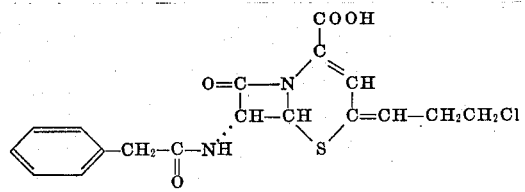

is eluted, which crystallizes on standing in the cold in the form of small plates, m.p. 84°–87°C; thin layer chromatography (silica gel; system: toluene/acetic acid/water 5:5:1): Rf = 0.34; ultra-violet absorption spectrum; in ethanol $\lambda_{max}$ 314 m$\mu$, and in ethanol/potassium hydroxide $\lambda_{max}$ 306 m$\mu$; infrared absorption spectrum (potassium bromide): characteristic bands at 2.80–4.10$\mu$, 5.55–5.70$\mu$, 6.05$\mu$, 6.24$\mu$, and 6.50–6.60$\mu$.

A solution of 0.03 g of 4-(3-chloro-1,1-propylidene)-7-N-phenylacetyl-amino-8-oxo-5-thia-1-azabicyclo[4,2,0]-oct-2-ene-2-carboxylic acid in 2 ml of tetrahydrofuran is treated with a solution of 0.05 g of diazomethane in 2.5 ml of ether. After standing for 5 minutes at room temperature, the solvents are distilled off under reduced pressure. The residue crystallizes on standing and upon recrystallization from a mixture of methylene chloride and hexane yields the 4-(3-chloro-1,1-propylidene)-7-N-phenylacetyl-amino-8-oxo-5-thia-1-azabicyclo[4,2,0]oct-2-ene-2-carboxylic acid methyl ester of the formula

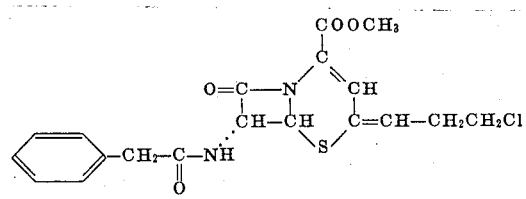

in yellow needles, m.p. 174°–176°C; [$\alpha$]$_D^{20}$ = +58°±2° ($c$ = 0,59 in chloroform); thin layer chromatogram (system: benzene/ethyl acetate 1:1): Rf = 0.43; ultra-violet absorption spectrum: $\lambda_{max}$ 321 m$\mu$ (in ethanol); infrared absorption spectrum (in methylene chloride): characteristic bands at 2.97$\mu$, 3.30–3.50$\mu$, 5.61$\mu$, 5.81$\mu$, 5.94$\mu$, 6.23$\mu$, and 6.74$\mu$.

The starting materials used in the above Examples can, for example, be prepared as follows:

EXAMPLE 22

A mixture of 5 g of 2-carbo-tert.-butyloxy-3,3-dimethyl-4-thia-2,6-diaza-bicyclo[3,2,0]heptan-7-one and 5.5 g of glyoxylic acid tert.-butyl ester hydrate in 40 ml of dioxane is stirred for 13½hours at 95°C in a closed vessel and then evaporated. The residue is dissolved in 1000 ml of pentane, washed three times with 500 ml of water and once with 200 ml of a saturated aqueous sodium chloride solution, dried over dry sodium sulphate and evaporated. An approximately 50:50-mixture of the two isomers of $\alpha$-(2-carbo-tert.-butyloxy-3,3-dimethyl-7-oxo-4-thia-2,6-diaza-6-bicyclo[3,2,0]heptyl)-$\alpha$-hydroxy-acetic acid tert.-butyl ester of the formula

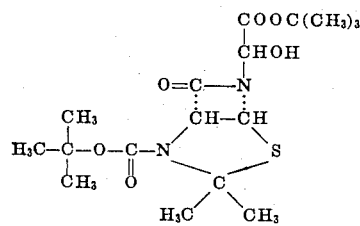

is thus obtained. A total of 0.9 g of the resulting mixture is crystallized from pentane and recrystallized from a mixture of ether and pentane, whereupon one isomer of the above compound, m.p. 134°–137°C, is obtained; [$\alpha$]$_D$ = −365° ± 1° ($c$ = 1.102 in chloroform); thin layer chromatogram: Rf = 0.49 in a 1:1-mixture of benzene and ethyl acetate; infrared spectrum (in methylene chloride): characteristic bands at 2.94μ, 5.62μ, 5.77μ, and 5.85μ.

EXAMPLE 23

A mixture of 6 g of a 1:1-mixture of the isomers of α-(2-carbo-tert.-butyloxy-3,3-dimethyl-7-oxo-4-thia-2,6-diaza-6-bicyclo[3,2,0]heptyl)-α-hydroxy-acetic acid tert.-butyl ester and 10.5 g of the so-called "-polystyrene Hunig base" (manufactured by warming a mixture of 100 g of chloromethyl-polystyrene [J.Am.Chem.Soc. 85, 2149 (1963)], 500 ml of benzene, 200 ml of methanol and 100 ml of diisopropylamine to 150°C while shaking, filtering, washing with 1,000 ml of methanol, 1,000 ml of a 3:1-mixture of dioxane and triethylamine, 1,000 ml of methanol, 1,000 ml of dioxane and 1,000 ml of methanol and drying for 16 hours at 100°C/10 mm Hg; the product neutralizes 1.55 milliequivalents of hydrochloric acid per gram in a 2:1-mixture of dioxane and water) in 240 ml of a 1:1-mixture of dioxane and tetrahydrofuran is stirred for 20 minutes. After cooling, the mixture is treated dropwise, over the course of 20 minutes, with a solution of 6 g of thionyl chloride in 50 ml of dioxane and is stirred for 140 minutes at 20°C and then filtered. The filtrate is evaporated, the residue is taken up in 200 ml of pentane and the solution is treated with 1 g of an active charcoal preparation and then filtered. An approximately 1:1-mixture of the isomers of the α-(2-carbo-tert.-butyloxy-3,3-dimethyl-7-oxo-4-thia-2,6-diaza-6-bicyclo[3,2,0]heptyl)-α-chloroacetic acid tert.-butyl ester of the formula

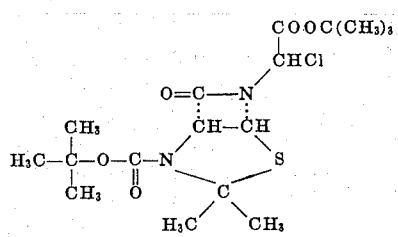

is thus obtained and is further processed without purification.

EXAMPLE 24

A solution of 11.3 g of a crude mixture of the isomers of α-(2-carbo-tert.-butyloxy-3,3-dimethyl-7-oxo-4-thia-2,6--diaza-6-bicyclo[3,2,0]heptyl)-α-chloroacetic acid tert.-butyl ester in 150 ml of absolute dioxane is mixed with 11.4 g of triphenylphosphine and 10.8 of "-polystyrene Hunig base" (or diisopropylaminomethyl-polystyrene), stirred for 17 hours at 55°C under a nitrogen atmosphere, then cooled and filtered through a glass filter. The residue is washed with 100 ml of benzene; the filtrate is evaporated under a waterpump vacuum and the residue is dried under a high vacuum, dissolved in 100 ml of a 9:1-mixture of hexane and ethyl acetate and chromatographed on a column (height: 48 cm; diameter: 6 cm), using acid-washed silica gel. Triphenylphosphine and a small amount of triphenylphosphine-sulphide are eluted with 2,000 ml of a 3:1-mixture of hexane and ethyl acetate, and the α-(2-carbo-tert.-butyloxy-3,3-dimethyl-7-oxo-4-thia-2,6-diaza-6-bicyclo[3,2,0]heptyl)-α-(triphenylphosphoranylidene)-acetic acid tert.-butyl ester of the formula

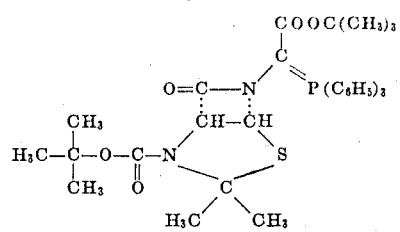

is eluted with a further 4,000 ml of the 3:1-mixture of hexane and ethyl acetate; an additional quantity of the impure product can be obtained with 1,500 ml of the same solvent mixture. The product has an Rf-value of 0.5 in the thin layer chromatogram (silica gel; system: 1:1-mixture of benzene and ethyl acetate) and crystallises from a mixture of ether and pentane, m.p. 121°-122°C; $[\alpha]_D = -219° \pm 1°$ ($c = 1.145$ in chloroform); ultra-violet absorption spectrum (in ethanol): $\lambda_{max}$ = 225 mμ ($\epsilon$ = 30,000) and 260 mμ ($\epsilon$ = 5400); infrared absorption spectrum (in methylene chloride): characteristic bands at 5.76μ, 5.80μ (shoulder), 5.97μ, 6.05μ (shoulder) and 6.17μ. A further quantity of the product can be isolated from the mother liquor by crystallization in an ether-pentane mxiture.

EXAMPLE 25

A solution of 2 g of α-(2-carbo-tert.-butyl-oxy-3,3-dimethyl-7-oxo-4-thia-2,6-diaza-6-bicyclo[3,2,0]heptyl)-α-(triphenyl-phosphoranylidene)-acetic acid tert.-butyl ester and 0.7 g of benzylglyoxal (in the enol form) in 30 ml of dry toluene is heated for 23 hours at 80°C (bath tempera-ture) in a nitrogen atmosphere, and is then mixed with a further quantity of 0.2 g of benzylglyoxal; the reaction mixture is heated for 22 hours at 80°C. The solvent is removed under reduced pressure and the viscous residue is chromatographed on a column of 60 g of acid-washed silica gel. The excess of benzylglyoxal is eluted with 450 ml of benzene; a mixture of the isomers of α-(2-carbo-tert.-butyloxy-3,3-dimethyl-7-oxo-4-thia-2,6-diaza-6-bicyclo[3,2,0]heptyl)-α-(phenylacetylmethylene)-acetic acid tert.-butyl ester of the formula

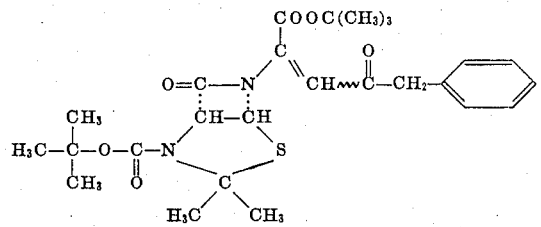

is eluted with 250 ml (10 fractions) of a 95:5-mixture of benzene and ethyl acetate, and a polar material is eluted with a further quantity of the same solvent mixture.

The above isomer mixture is again chromatographed on 60 g of acid-washed silica gel, elution being carried out with a 99:1-mixture of benzene and ethyl acetate. A product consisting mainly of benzylglyoxal is obtained in the first run, and then a fraction I, consisting mainly of the isomer A, is obtained with 125 ml, a fraction II, consisting of a mixture of both isomers with 250 ml, and a fraction III, consisting mainly of isomer B with 300 ml. The above three fractions are recrystallized from hexane, whereupon fraction I yields the isomer A (trans); m.p. 109–110°C; $[\alpha]_D^{20} = -452° \pm 1°$ ($c = 1$ in chloroform); thin layer chromatogram: Rf = 0.49 (silica gel; system hexane/ethyl acetate 2:1); ultra-violet absorption spectrum $\lambda_{max}$ 299 mμ (in ethanol), 337 mμ (in potassium hydroxide/ethanol), and 337 mμ (on acidifying a basic solution in ethanol); infrared absorption spectrum (in methylene chloride): characteristic bands at 5.63μ, 5.83μ (shoulder), 5.85–5.95μ, and 6.29μ; and fractions II and III yield the isomer B (cis); m.p. 157°–158°C; $[\alpha]_D^{20} = -363° \pm 0.7°$ ($c = 1$ in chloroform); thin layer chromatogram: Rf = 0.42 (silica gel; system hexane/ethyl acetate 2:1); ultra-violet absorption spectrum: $\lambda_{max}$ 294 mμ ($\epsilon = 19{,}300$) (in ethanol), 335 mμ (potassium hydroxide/ethanol), and 335 mμ (on acidifying a basic solution in ethanol); infrared absorption spectrum (in methylene chloride): characteristic bands at 5.63μ, 5.80μ (shoulder), 5.84–5.96μ, and 6.34μ. Further quantities of the two isomers can be isolated from the mother liquors in the same manner.

EXAMPLE 26

A solution of 0.0162 of isomer B of α-(2-carbo-tert.-butyloxy-3,3-dimethyl-7-oxo-4-thia-2,6-diaza-6-bicyclo-[3,2,0]heptyl)-α-(phenylacetylmethylene)-acetic acid tert.-butyl ester in 10.6 ml of benzene is irradiated with ultra-violet light at room temperature in a Pyrex glass vessel under a nitrogen atmosphere. After 90 minutes the solvent is distilled off; according to a nuclear resonance spectrum the non-crystalline residue consists of an approximately 42:58-mixture of isomer A and isomer B of α-(2-carbo-tert.-butyl-oxy-3,3-dimethyl-7-oxo-4-thia-2,6-diaza-6-bicyclo[3,2,0]heptyl)-α-(phenylacetylmethylene)-acetic acid tert.-butyl ester.

The crystalline isomer B and fractions which predominantly consist of isomer B of α-(2-carbo-tert.-butyl-oxy-3,3-dimethyl-7-oxo-4-thia-2,6-diaza-6-bicyclo[3,2,0]heptyl)-α-(phenylacetylmethylene)-acetic acid tert.-butyl ester can in the same manner be isomerized to give isomer mixtures containing isomer A and isomer B of α-(2-carbo-tert.-butyloxy-3,3-dimethyl-7-oxo-4-thia-2,6-diaza-6-bicyclo[3,2,0]heptyl) -α-(phenylacetylmethylene)-acetic acid tert.-butyl ester.

EXAMPLE 27

One g of α-(2-carbo-tert.-butyloxy-3,3-dimethyl-7-oxo-4-thia-2,6-diaza-6-bicyclo[3,2,0]heptyl)-α-(triphenyl- phosphoranylidene)-acetic acid tert.-butyl ester is treated under nitrogen with 0.65 g of isopropylglyoxal in 7 ml of toluene, and the mixture is allowed to stand for 8 days at 90°C. The solvent and the excess isopropylglyoxal (in the enol form) are removed under reduced pressure at 50°C and the residue is chromatographed on 50 g of acid-washed silica gel; elution is carried out with a 4:1-mixture of hexane and ethyl acetate. The first 150 ml elute the isomer A (trans) of α-(2-carbo-tert.-butyloxy-3,3-dimethyl-7-oxo-4-thia-2,6-diaza-6-bicyclo-[3,2,0]heptyl)-α-(isobutyryl-methylene)-acetic acid tert.-butyl ester of the formula

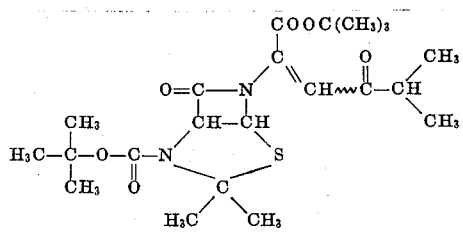

which after crystallization from a mixture of hexane and ethyl acetate melts at 133°–134°C; ultra-violet absorption spectrum: in ethanol $\lambda_{max}$ 294 mμ; in potassium hydroxide/ethanol $\lambda_{max}$ 330 mμ; and in hydrogen chloride/ethanol $\lambda_{max}$ 330 mμ; infrared absorption spectrum (in methylene chloride): characteristic bands at 5.62μ, 5.80μ (shoulder), 5.84–5.94μ, and 6.26μ.

The isomer B (cis) of α-(2-carbo-tert.-butyloxy-3,3-dimethyl-7-oxo -4-thia-2,6-diaza-6-bicyclo[3,2,0]heptyl)-α-(isobutyrylmethylene)-acetic acid tert.-butyl ester is obtained on further elution with the same solvent mixture and melts at 146°–147°C after crystallization from a mixture of hexane and ethyl acetate; ultra-violet absorption spectrum: in ethanol $\lambda_{max}$ 289 mμ; in potassium hydroxide/ethanol $\lambda_{max}$ 328 mμ; and in hydrogen chloride/ethanol $\lambda_{max}$ 328 mμ; infrared absorption spectrum (in methylene chloride): characteristic bands at 5.60–5.66 μ, 5.75 μ(shoulder), 5.85–5.95μ and 6.31μ.

EXAMPLE 28

A mixture of 0.05 g of α-(2-carbo-tert.-butyloxy-3,3-dimethyl-7-oxo-4-thia-2,6-diaza-6-bicyclo[3,2,0]heptyl) -α-(triphenylphosphoranylidene)-acetic acid tert.-butyl ester and 0.0355 g of 4-nitrobenzyl-glyoxal in 0.6 ml of toluene is heated at 80°C for 7 hours. The solvent is then distilled off under reduced pressure and the residue is chromatographed on a thin layer silica gel plate (20×20×0.15 cm), the chromatogram being developped with a 2:1-mixture of hexane and acetic acid ethyl ester. Two yellow bands are obtained, with the upper band yielding the isomer A (trans) of α-(2-carbo-tert.-butyloxy-3,3-dimethyl-7-oxo-4-thia-2,6-diaza-6-bicyclo-[3,2,0]heptyl)-α-[(4-nitro-phenylacetyl)-methylene]-acetic acid tert.-butyl ester of the formula

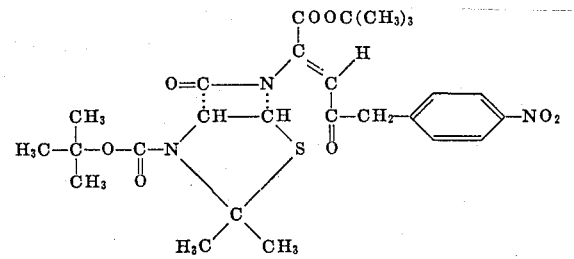

having an Rf-value = 0.41; ultra-violet absorption spectrum: $\lambda_{max}$288 mμ (broad; in ethanol), and $\lambda_{max}$ 505 mμ and 262 mμ (potassium hydroxide/ethanol); infrared absorption spectrum (in methylene chloride): characteristic bands at 5.63μ, 5.83μ (shoulder), 5.88 –5.92μ, 5.97μ (shoulder), 6.28–6.33μ, 6.59μ and 7.45μ; and the lower yields the isomer B (cis) of α-(2-carbo-tert.-butyloxy-3,3-dimethyl-7 -oxo-4-thia-2,6-diaza-6-bicyclo[3,2,0]heptyl)-α-[(4-nitro-phenylacetyl)-methylene]-acetic acid tert.-butyl ester of the formula

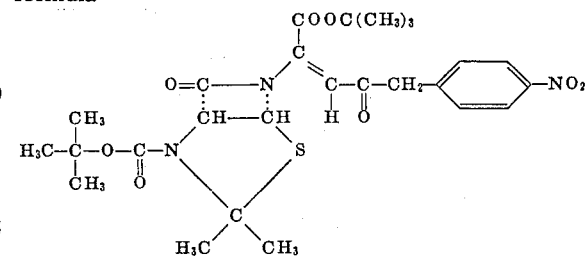

as yellow glass-like products. The isomer B crystallizes from hexane, m.p. 173°C; Rf-valve = 0.29; ultra-violet absorption spectrum in ethanol: $\lambda_{max}$ 293 mμ, and in potassium hydroxide/ethanol:$\lambda_{max}$ 335 mμ and 285 mμ; infrared absorption spectrum (in methylene chloride): characteristic bands at 5.62μ, 5.77μ (shoulder), 5.83–5.92μ, 6.30–6.35μ, 6.59μ, and 7.45μ.

The 4-nitro-benzylglyoxal used above as the starting material can be manufactured as follows: A solution of about 4 g of diazomethane in 200 ml of dry ether is mixed dropwise with 6 g of 4-nitrophenylacetyl chloride in 80 ml of dry tetrahydrofuran while stirring, with the temperature being kept at 0°–5°C by stirring in a bath of ice water. The addition is completed after about 30 minutes; the reaction mixture is stirred for a further 15 minutes at 0°–5°C and is then evaporated in a rotational evaporator. The solid residue is dissolved in a mixture of methylene chloride and ether, the small amount of solid material is filtered off and the filtrate is evaporated. The 4-nitrobenzyl-diazomethyl-ketone is thus obtained, which after crystallization from a mixture of ether and hexane melts at 90°–92°C; infrared absorption spectrum (in methylene chloride); characteristic bands at 4.78μ, 6.10μ, 6.26μ, 6.58μ, and 7.45μ.

A solution of 3 g of 4-nitrobenzyl-diazomethyl-ketone in 100 ml of a 1:1-mixture of ether and methylene chloride is mixed with a solution of 4.22 g of triphenylphosphine in 100 ml of ether. After about 5 minutes, the 1-(4-nitro-phenyl)-3-(triphenylphosphoranylidene-hydrazono)-acetone crystallizes out at room temperature. The mixture is filtered and the mother liquor is concentrated; a further quantity of the desired product crystallizes from the mother liquor. The crude product is crystallized from a mixture of 50 ml of methylene chloride and 250 ml of hexane, m.p. 160°–165°C; ultra-violet absorption spectrum (in ethanol): λ $_{max}$ 320 mμ and 270–275 mμ (shoulder); infrared absorption spectrum (in methylene chloride): characteristic bands at 610μ (shoulder), 6.14–6.20μ, 6.32μ, 6.67–6.74μ, and 7.45μ.

A suspension of 0.467 g of 1-(4-nitrophenyl)-3-(triphenylphosphoranylidene-hydrazono)-acetone in 3 ml of tetrahydrofuran is mixed with 0.21 g of pulverized sodium nitrite and 1.2 ml of water. The mixture is cooled to 0°–5°C and mixed dropwise over the course of 2 minutes with 2.2 ml of 2N hydrochloric acid, whereupon an emulsion forms. After 60 minutes at 0°–5°C, the aqueous layer is separated off and extracted four times with 10 ml of methylene chloride at a time. The combined organic solutions are twice washed with 10 ml at a time of saturated aqueous sodium chloride solution and evaporated; the residue is chromatographed on 20 g of acid-washed silica gel. The crystalline, enolised 4-nitro-benzylglyoxal is eluted with 600 ml of benzene, m.p. 163°–164°C; ultraviolet absorption spectrum in ethanol: λ $_{max}$ 343 mμ, in potassium hydroxide/ethanol: 444 mμ, and in hydrochloric acid/ethanol: λ $_{max}$ 343 mμ; infrared absorption spectrum (in methylene chloride): characteristic bands at 3.025.98μ, 6.06μ, 6.28μ, 6.60μ, and 7.47μ. The hydrate of 4-nitrobenzyl-glyoxal is eluted with a 9:1-mixture of benzene and ethyl acetate as a non-crystalline syrupy material; infrared absorption spectrum (in methylene chloride): characteristic bands at 3.01μ, 5.82μ, 6.27μ, 6.61μ, and 7.47μ. EXAMPLE 29

A mixture of 0.872 g of α-(2-carbo-tert.-butyloxy-3,3-dimethyl-7-oxo-4-thia-2,6-diaza-6-bicyclo[3,2,0 ]heptyl)-α-(triphenylphosphoranylidene)-acetic acid tert.-butyl ester and 0.611 g of 4 -nitrobenzyl-glyoxal-hydrate in 10.5 g of toluene is heated at 80°C for 6½ hours. The solvent is distilled off under reduced pressure and the residue is chromatographed on 50 g of acid-washed silica gel. The isomer A (trans) of α-(2-carbo-tert.-butyloxy-3,3-dimethyl-7-oxo-4-thia-2,6-diaza-6-bicyclo[3,2,0]heptyl)-α-[(4-nitro-phenylacetyl)-methylene]-acetic acid tert.-butyl ester is eluted with 1300 ml of benzene and 500 ml of a 98.5:1.5-mixture of benzene and ethyl acetate. A mixture of the two isomers A and B of α-(2-carbo-tert.-butyloxy-3,3-dimethyl-7-oxo-4-thia-2,6-diaza-6-bicyclo[3,2,0]heptyl)-α-[(4-nitro-phenylacetyl)-methylene]-acetic acid tert.-butyl ester is eluted with 200 ml of a 96:4-mixture of benzene and ethyl acetate, and the isomer B (cis) of 60 (acetic acid tert. -butyl ester α-(2-carbo-tert.-butyloxy-3,3-dimethyl-7-oxo-4-thia-2,6-diaza-6-bicyclo[3,2,0]heptyl)-α-[(4-nitro-phenyl-acetyl)-methylene]-acetic acid tert.-butyl ester together with a small quantity of isomer A is eluted with a further 400 ml of the 96:4-mixture of benzene and ethyl acetate. The mixture is resolved by means of thin layer chromatography (4 silica gel plates; 20 × 20 × 0.15 cm), the chromatogram being developped with a 2:1-mixture of hexane and ethyl acetate; a further quantity of isomer A; Rf = 0.41; and of isomer B; Rf = 0.29; is thus obtained. The latter is combined with the almost pure isomer B from the chromatogram and crystallized from hexane, m.p. 173°C.

EXAMPLE 30

A mixture of 0.714 g of α-(2-carbo-tert.-butyl-oxy-3,3-dimethyl-7-oxo-4-thia-2,6-diaza-6-bicyclo[3,2,0 ]hep-tyl)-α-(triphenylphorphoranylidene)-acetic acid tert.-butyl ester and 0.67 g of 4-methoxybenzylglyoxal hydrate in 8.6 ml of toluene is heated at 80°C for 3½ hours and is then evaporated under reduced pressure. The residue is chromatographed on 50 g of acid-washed silica gel. The excess of 4-methoxy-benzyl-glyoxal is eluted in an anhydrous form by means of 500 ml of benzene, while 800 ml of a 99:1-mixture of benzene and ethyl acetate elute the almost pure isomer A (trans) of α-(2-carbo-tert.-butyloxy-3,3-dimethyl-7-oxo-4thia-2,6-diaza-6-bicyclo[3,2,0]heptyl)-α-[(4-methoxy-phenylacetyl)-methylene]-acetic acid tert.-butyl ester of formula

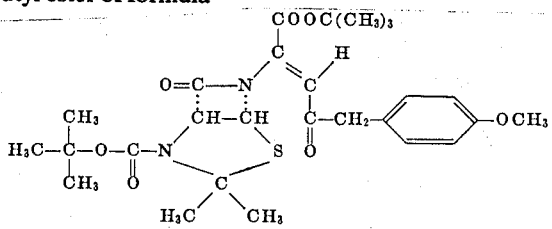

m.p. 105°–107°C after recrystallization from a mixture of ethyl acetate and hexane; ultra-violet absorption spectrum in ethanol: λ $_{max}$ 298 mμ, 288 mμ (shoulder) and 225 mμ (shoulder), and in potassium hydroxide/ethanol: λ $_{max}$ 340 mμ; infrared absorption spectrum (in methylene chloride): characteristic bands at 5.63μ, 5.82μ (shoulder), 5.87–5.97μ, 6.23μ (shoulder), 6.28μ, 6.63μ, and 6.77μ. A further 400 ml of the 99:1-mixture of benzene and ethyl acetate elute a mixture of isomers A and B, and 300 ml of a 98:2- mixture of benzene and ethyl acetate elute isomer B (cis) of α-(2-carbo-tert.-butyloxy-3,3-dimethyl-7-oxo-4-thia-2,6-diaza-6-bicyclo[3,2,0]heptyl)-α-[(4-methoxy-phenylacetyl)-methylene]-acetic acid tert.-butyl ester of formula

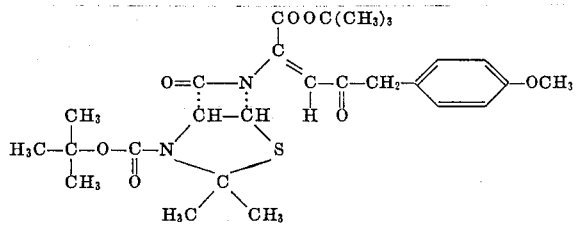

The pure isomer B obtained from the mixed fraction by recrystallization from hexane and the pure isomer B obtained in the same manner from the isomer B fraction melting at 169°–170°C; ultra-violet absorption spectrum in ethanol: $\lambda_{max}$ 289 mμ (broad) and 227 mμ (shoulder), and in potassium hydroxide/ethanol: $\lambda_{max}$ 343 mμ; infrared absorption spectrum (in methylene chloride): characteristic bands at 5.59μ, 5.75μ (shoulder), 5.80–5.93μ, 6.24μ (shoulder), 6.30μ, and 6.60μ.

Further quantities of the two isomers A and B of α-(2-carbo-tert.-butyloxy-3,3-dimethyl-7-oxo-4-thia-2,6-diaza-6-bicyclo[3,2,0]heptyl)-α-[(4-methoxy-phenylacetyl)-methylene]-acetic acid tert.-butyl ester can be obtained from the combined mother liquors by means of preparative thin layer chromatography and development with a 2:1-mixture of hexane and ethyl acetate.

The 4-methoxybenzyl-glyoxal-hydrate used as the starting material in the above example can be obtained as follows:

A solution of 7.43 g of 4-methoxy-phenylacetyl chloride in 100 ml of dry ether is added dropwise to a solution, cooled to 0°–5°C, of 6 g of diazomethan in 300 ml of ether. The reaction mixture is stirred for a further 30 minutes, finally without cooling. The excess of diazomethane and the solvent are removed under reduced pressure in a rotational evaporator and the residue is dissolved in 100 ml of ether; the small quantity of waxy material is filtered off. After evaporation of the filtrate, the 4-methoxy-benzyl-diazomethylketone is obtained; infrared absorption spectrum (in methylene chloride): characteristic bands at 4.79μ, 6.10μ, 6.22μ (shoulder), 6.62μ and 7.73–7.45μ; this material is further processed without purification.

A solution of 7.52 g of 4-methoxybenzyl-diazomethyl-ketone in 300 ml of ether is mixed with 11.1 g of triphenylphosphine in 200 ml of ether. The reaction mixture is stirred at room temperature, whereupon a crystalline precipitate forms after a few minutes, which is filtered off after 1 hour and washed with cold ether. The 1-(4-methoxy-phenyl)-3-(triphenylphosphoranylidene-hydrazono)-acetone, m.p. 111°–112°C, is thus obtained; infrared absorption spectrum (in methylene chloride): characteristic bands at 4.80μ, 6.05μ (shoulder), 6.14μ, 6.24μ (shoulder) and 6.63–6.70μ and is processed without further purification.

A solution of 1.82 g of 1-(4-methoxyphenyl)-3-(triphenylphosphoranylidene-hydrazono)-acetone in 12 ml of tetrahydrofuran is mixed with 0.84 g of pulverized sodium nitrite and the mixture is diluted with 5 ml of water. The resulting suspension is cooled to 0°–5°C, treated dropwise over the course of 7 minutes with 8.8 ml of 2N hydrochloric acid and then kept for a further 30 minutes at 0°–5°C. The aqueous phase is twice washed with methylene chloride; the combined organic solutions are washed with a saturated aqueous sodium chloride solution, dried over sodium sulphate and evaporated under reduced pressure. The oily residue is chromatographed on 40 g of acid-washed silica gel. A small quantity of a byproduct is eluted with benzene and with 1200 ml of a 95:5-mixture of benzene and ethyl acetate, the 4-methoxybenzylglyoxal, mainly in the form of the hydrate, is obtained as an oily product; infrared absorption spectrum (in methylene chloride): characteristic bands at 2.96μ, 5.79–5.84μ, 6.23μ, and 6.63μ. The anhydrous product melts at 139°–140°C after recrystallization from a mixture of chloroform and hexane; ultra-violet absorption spectrum in ethanol or hydrochloric acid/ethanol: $\lambda_{max}$ 333 mμ, and in potassium hydroxide/ethanol: $\lambda_{max}$ 367 mμ; infrared absorption spectrum (in methylene chloride): characteristic bands at 3.00μ, 5.97μ, 6.09μ, 6.24μ, 6.61μ, and 7.15μ.

EXAMPLE 31

A solution of 0.8 g of α-(2-carbo-tert.-butyl-oxy-3,3-dimethyl-7-oxo-4-thia-2,6-diaza-6-bicyclo[3,2,0]heptyl)-α-(triphenylphosphoranylidene)-acetic acid tert.-butyl ester and 1.2 g of crude 4-chlorobenzyl-glyoxal hydrate in 12 ml of toluene is heated for 5 hours at 80°C. The solvent is distilled off under reduced pressure and the syrupy residue is dissolved in about 4 ml of benzene. The resulting crystalline precipitate, consisting of the enol of 4-chlorobenzyl-glyoxal, is filtered off and the filtrate is chromatographed on a column of 50 g of acid-washed silica gel. Using 500 ml of benzene, a further quantity of 4-chlorobenzyl-glyoxal is eluted, and using 200 ml of benzene and 800 ml of a 97:3-mixture of benzene and ethyl acetate, a mixture of the isomers of α-(2-carbo-tert.-butyloxy-3,3-dimethyl-7-oxo-4-thia-2,6-diaza-6-bicyclo[3,2,0]heptyl)-α-[(4-chlorophenyl-acetyl)-methylene]-acetic acid tert.-butyl ester is eluted, which is chromatographed on a further 50 g of acid-washed silica gel by means of benzene and benzene containing 5 percent of ethyl acetate and is then resolved by preparative thin layer chromatography (system: hexane/ethyl acetate 2:1). One thus obtains the non-crystalline isomer A (trans) of α-(2-carbo-tert.-butyloxy-3,3-dimethyl-7-oxo-4-thia-2,6-diaza-6-bicyclo[3,2,0]heptyl)-α-[(4-chlorophenylacetyl)-methylene]-acetic acid tert.-butyl ester of the formula

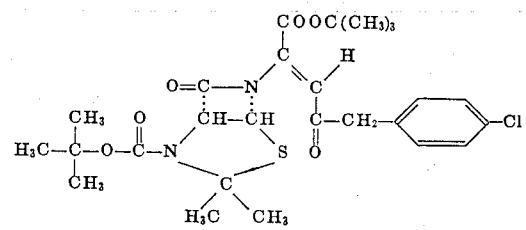

which shows the following bands in the ultra-violet absorption spectrum: $\lambda_{max}$ 300 mμ (in ethanol); $\lambda_{max}$ 342 mμ (in potassium hydroxide/ethanol); and $\lambda_{max}$ 338 mμ (on adding hydrogen chloride to the above sample); infrared absorption spectrum (in methylene chloride): characteristic bands at 5.60μ, 5.75μ (shoulder), 5.80–5.92μ (broad), 6.26μ, and 6.70μ; and the crystalline isomer B (cis) of α-(2-carbo-tert.-butyl-oxy-3,3-dimethyl-7-oxo-4-thia-2,6-diaza-6-bicyclo[3,2,0]heptyl)-α-[(4-chlorophenylacetyl)-methylene]-acetic acid tert.-butyl ester of formula

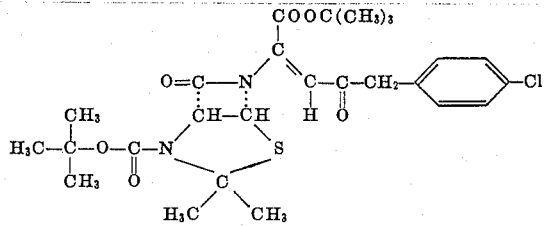

which after recrystallization from hexane melts at 178°–179°C; ultra-violet absorption spectrum: $\lambda_{max}$ 295 mμ (in ethanol); $\lambda_{max}$ 337 mμ (in potassium hydroxide/ethanol); and $\lambda_{max}$ 337 mμ (on adding hydrogen chloride to the above sample); infrared absorption spectrum (in methylene chloride): characteristic bands at 5.59μ, 5.75μ (shoulder), 5.78–5.94μ; 6.07μ (shoulder), 6.31μ and 6.70μ. The isomer A is further processed without purification.

The 4-chlorobenzyl-glyoxal hydrate can be manufactured as follows:

A solution of 16.5 g of 4-chlorophenylacetyl chloride in 150 ml of dry ether is added dropwise, with vigorous stirring and while cooling in an ice-water bath, to about 11 g of diazomethane in 500 ml of ether. After allowing the mixture to react for 30 minutes at 5°–10°C, the diazomethane and the solvent are distilled off under reduced pressure. The 4-chlorobenzyl-diazomethyl ketone, which can be obtained as a yellowish crystalline residue, is further processed without purification; infrared absorption spectrum (in methylene chloride): characteristic bands at 4.84μ, 6.22μ, 6.80μ, and 7.47μ.

A solution of 17 g of 4-chlorobenzyl-diazomethyl ketone in 150 ml of ether is added at room temperature to a solution of 23.5 g of triphenylphosphine in 300 ml of ether. A yellowish crystalline precipitate is filtered off after 20 minutes, washed with ether and recrystallized from a mixture of methylene chloride and ether; the 1-(4-chloro-phenyl)-3-(triphenylphosphoranylidene-hydrazono)-acetone thus obtainable melts at 130°–131°C; ultra-violet absorption spectrum:$\lambda_{max}$ 320 mμ (ethanol); $\lambda_{max}$ 320 mμ (potassium hydroxide/ethanol); and $\lambda_{max}$ 255–278 mμ (broad shoulder) (in hydrogen chloride/ethanol); infrared absorption spectrum (in methylene chloride): characteristic bands at 4.76μ, 6.03μ (shoulder), 6.12μ, 6.28μ (shoulder), and 6.65–6.75μ.

A suspension of 8 g of 1-(4-chlorophenyl)-3-(triphenylphosphoranylidene-hydrazono)-acetone and 3.6 g of sodium nitrite in 51 ml of tetrahydrofuran and 22 ml of water is mixed dropwise over the course of about 10 minutes with 37 ml of 2N hydrochloric acid while stirring and cooling in an ice-water bath (10°–13°C), in the course of which two phases form. The mixture is stirred for 30 minutes at room temperature, the organic phase is separated and the aqueous phase is repeatedly extracted with methylene chloride. The combined organic solutions are dried over sodium sulphate and evaporated under reduced pressure. A syrupy residue is obtained which is chromatographed on 60 g of acid-washed silica gel. The crude 4-chlorobenzyl-glyoxal hydrate is extracted with benzene and with a 95:5-mixture of benzene and ethyl acetate; ultra-violet absorption spectrum:$\lambda_{max}$ 222 mμ (in ethanol); $\lambda_{max}$ 365 mμ (in potassium hydroxide/ethanol); and $\lambda_{max}$ 316 mμ (in hydrogen chloride/ethanol); infrared absorption spectrum (in methylene chloride): characteristic bands at 2.87–4.3μ, 5.77μ, 6.27μ, and 6.72μ; the material is further processed without purification. The anhydrous 4-chlorobenzyl-glyoxal in the enol form melts at 144°–147°C after recrystallization from methylene chloride; ultra-violet absorption spectrum: $\lambda_{max}$ 316 mμ (in ethanol); $\lambda_{max}$ 364 mμ (in potassium hydroxide/ethanol); and $\lambda_{max}$ 316 mμ (in hydrogen chloride/ethanol); infrared absorption spectrum (in methylene chloride): characteristic bands at 2.92μ, 5.97μ, 6.07μ, 6.29μ, and 6.71μ.

EXAMPLE 32

A solution of 2.5 g of α-(2-carbo-tert.-butyl-oxy-3,3-dimethyl-7-oxo-4-thia-2,6-diaza-6-bicyclo[3,2,0]heptyl)-α-(triphenylphosphoranylidene)-acetic acid tert.-butyl ester and 1.3 g of cyclohexylmethyl-glyoxal hydrate in 50 ml of toluene is heated to 80°C for 4 hours and the solvent is evaporated off under reduced pressure. The syrupy residue is triturated with ether, the resulting triphenylphosphine oxide is filtered off and the filtrate is evaporated. The residue is chromatographed on 120 g of acid-washed silica gel, elution being carried out with a 98:2-mixture and a 9:1-mixture of hexane and ethyl acetate. The isomer A (trans) of α-(2-carbo-tert.-butyloxy-3,3-dimethyl-7-oxo-4-thia-2,6-diaza-6-bicyclo[3,2,0]heptyl)-α-(cyclohexylacetyl-methylene)-acetic acid tert.-butyl ester of the formula

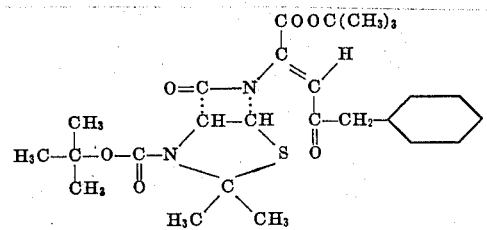

is obtained first in this way and is purified by means of preparative thin layer chromatography (20×20×0.15 cm plates; silica gel; system benzene/acetone 98:2) and obtained in a syrupy form; $[\alpha]_D^{20} = -451° \pm 1°$ ($c = 0.87$ in chloroform); ultra-violet absorption spectrum: $\lambda_{max}$ 297 mμ (in ethanol); $\lambda_{max}$ 334 mμ (in potassium hydroxide/ethanol); and $\lambda_{max}$ 334 mμ (on adding hydrogen chloride to the alkaline sample); infra-red absorption spectrum (in methylene chloride): characteristic bands at 3.45μ, 3.50μ, 5.61μ, 5.78μ, (shoulder), 5.80–5.95μ, 6.07μ (shoulder), and 6.28μ.

The isomer B (cis) of α-(2-carbo-tert.-butyl-oxy-3,3-dimethyl-7-oxo-4-thia-2,6-diaza-6-bicyclo[3,2,0]heptyl)-α-(cyclohexylacetyl-methylene)-acetic acid tert.-butyl ester of formula

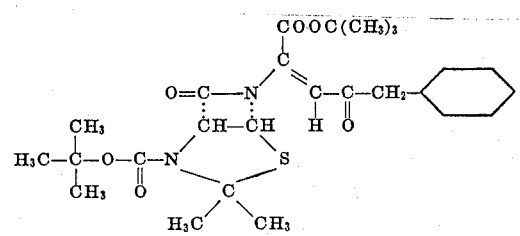

is eluted as the second product and crystallized from hexane, m.p. 154°–155°C; $[\alpha]_D^{20} = -232° \pm 1°$ ($c = 0.8$ in chloroform); ultra-violet absorption spectrum: $\lambda_{max}$ 288 mµ (in ethanol), $\lambda_{max}$ 333 mµ (in potassium hydroxide/ethanol) and $\lambda_{max}$ 333 mµ (on adding hydrogen chloride to the above alkaline sample); infrared absorption spectrum (in methylene chloride): characteristic bands at 3.44µ, 3.53µ, 5.60µ, 5.75µ (shoulder), 5.80–5.9µ, 6.05µ (shoulder), and 6.31µ.

The cyclohexylmethyl-glyoxal hydrate used as the starting material can be manufactured as follows:

A solution of 19.8 g of cyclohexylacetyl chloride (b.p. 98°–100°C/23 mm Hg) in 150 ml of dry ether is slowly added to a vigorously stirred solution of 11 g of diazomethane in 500 ml of ether while cooling to 0°–5 °C in an ice-water bath. The excess of diazomethane and the ether are distilled off under reduced pressure and the cyclohexylmethyl-diazomethyl ketone is obtained as a residue; infrared absorption spectrum (in methylene chloride): characteristic bands at 3.45µ, 3.52µ, 4.75µ, and 6.12µ; the material is further processed without purification.

A solution of 32 g of triphenylphosphine in 450 ml of ether is mixed all at once with a solution of 20 g of cyclohexyl-methyl-diazomethyl ketone in 100 ml of ether, while stirring. After stirring at room temperature for 30 minutes, the solvent is evaporated under reduced pressure. The 1-cyclohexyl-3-(triphenylphosphoranylidene-hydrazono)-acetone, which is obtainable as an oily residue, crystallises in the cold from ether, m.p. 58°–62°C; ultra-violet absorption spectrum: $\lambda_{max}$ 314 mµ, 2.62–2.75 mµ, and 223 mµ (in ethanol and in potassium hydroxide/ethanol), and $\lambda_{max}$ 257–275 mµ and 230 mµ (in hydrogen chloride/ethanol); infrared absorption spectrum (in methylene chloride): characteristic bands at 3.43µ, 3.56µ, 4.76µ, 6.15µ, and 6.67µ.

A mixture of 15 g of 1-cyclohexyl-3-(triphenylphosphoranylidene-hydrazono)-acetone and 7.37 g of sodium nitrite in 120 ml of tetrahydrofuran and 42 ml of water is slowly mixed with 77 ml of 2N hydrochloric acid while stirring and cooling to 10°–13°C (ice-water bath). After a further 30 minutes at room temperature, the organic solution is separated and the aqueous phase is extracted with methylene chloride. The combined organic solutions are dried over sodium sulphate and evaporated under reduced pressure. The syrupy residue is treated with ether, the resulting triphenylphosphine oxide is filtered off and the filtrate is evaporated. The residue is chromatographed on an acid-washed silica gel column (120 g), the cyclohexylmethyl-glyoxal hydrate being eluted as a syrupy product with about 3000 ml of a 97:3-mixture of hexane and ethyl acetate; infrared absorption spectrum (in methylene chloride): characteristic bands at 2.90–4.1µ (broad); 3.47µ, 3.53µ, and 5.80µ; the product is further processed without purification.

EXAMPLE 33

A solution of 1.5 g of α-(2-carbo-tert.-butyl-oxy-3,3-dimethyl-7-oxo-4-thia-2,6-diaza-6-bicyclo[3,2,0]-heptyl)-α-(triphenylphosphoranylidene)-acetic acid tert.-butyl ester and 1.0 g of 2-phenylethyl-glyoxal hydrate in 20 ml of toluene is heated for 2 hours at 80°C and then allowed to stand at room temperature for 16 hours. The toluene is removed under a high vacuum and the residue separated by means of preparative thin-layer chromatography; silica gel plates (100 × 20 × 0.15 cm) are used, and development is carried out with a 4:1-mixture of hexane and ethyl acetate. The less polar isomer A (trans) of α-(2-carbo-tert.-butyloxy-3,3-dimethyl-7-oxo-4-thia-2,6-diaza-6-bicyclo[3,2,0]heptyl)-α-[(3-phenyl-propionyl)-methylene]-acetic acid tert.-butyl ester of the formula

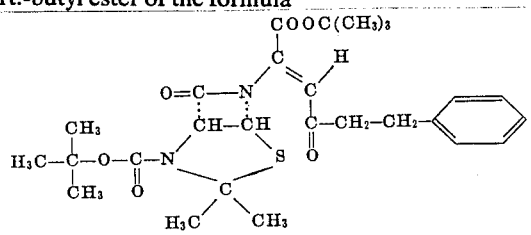

is obtained, which crystallizes spontaneously and, after recrystallization from hexane, melts at 100°–102°C; $[\alpha]_D^{20} = -428° \pm 1°$ ($c = 1$ in chloroform); ultra-violet absorption spectrum (in ethanol): $\lambda_{max}$ 292 mµ ($\epsilon$ = 11100); infrared absorption spectrum (in methylene chloride): characteristic bands at 5.62µ, 5.80µ (shoulder), 5.85–5.93µ, and 6.27µ. A further quantity is obtained from the mother liquors of crystallization.

The more polar fraction, which also crystallizes spontaneously, is recrystallized from hexane and yields the isomer B (cis) of α-(2-carbo-tert.-butyloxy-3,3-dimethyl-7-oxo-4-thia-2,6-diaza-6-bicyclo[3,2,0]heptyl)-α-[(3-phenyl-propionyl)-methylene]-acetic acid tert.-butyl ester of the formula

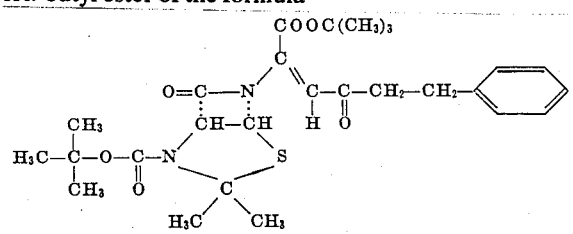

m.p. 129°–130°C; $[\alpha]_D^{20} = -358° \pm 1°$ ($c = 1.04$ in chloroform); ultraviolet absorption spectrum (in ethanol): $\lambda_{max}$ 289 mµ ($\epsilon = 18200$); infrared absorption spectrum (in methylene chloride): characteristic bands at 5.62µ, 5.75µ (shoulder), 5.82–5.94µ, and 6.27µ.

The 2-phenylethyl-glyoxal hydrate used as starting material may be prepared as follows:

A solution of 4.8 g of diazomethane in 240 ml of ether is treated in the course of 20 minutes with vigorous stirring with a solution of 7.1 g of dihydrocinnamic acid chloride in 100 ml of ether, the reaction mixture being cooled to −5°C. Stirring is continued for 15 minutes without cooling, and the volatile portions are distilled off under reduced pressure. As oily residue there is obtained the 2-phenyl-ethyl-diazomethyl ketone; infrared absorption spectrum (in methylene chloride): characteristic bands at 4.76µ, 6.11µ, 6.16µ (shoulder), and 6.69µ.

A solution of 7.45 g of crude 2-phenylethyl diazomethyl ketone in 200 ml of ether is treated at room temperature with a solution of 11 g of triphenyl phosphine in 200 ml of ether. The reaction mixture is stirred for 2 hours, the crystalline 1-benzyl-3-(triphenylphosphoranylidene-hydrazono)-acetone is filtered off and melts at 105°C after recrystallization from ether; ultra-violet absorption spectrum (in ethanol): $\lambda_{max}$ 316 mμ, 265–280 mμ (shoulder), and 223 mμ; infrared absorption spectrum (in methylene chloride): characteristic bands at 6.10μ and 6.63μ.

A total of 4.16 g of pulverulent sodium nitrite is suspended in a solution of 8 g of 1-benzyl-3-(triphenyl-phosphoranylidene-hydrazono)-acetone in 60 ml of tetrahydrofuran and 30 ml of water, and the suspension treated with 44 ml of 2N hydrochloric acid with vigorous stirring; the addition takes 15 to 20 minutes, the reaction mixture being cooled to 10°–15°C. After a further 15 minutes at room temperature, the reaction mixture is extracted with ether; the ether extract is washed with a concentrated aqueous sodium chloride solution, dried over sodium sulphate and evaporated. The residue is chromatographed on 100 g of silica gel (column), elution being carried out with 98:2- and 95:5-mixtures of benzene and ethyl acetate. The 2-phenylethyl-glyoxal hydrate is obtained; infrared absorption spectrum (in methylene chloride): characteristic bands at 2.88μ, 3.00–4.30μ (broad), and 5.77–5.86μ.

EXAMPLE 34

A solution of 0.55 g of α-(2-carbo-tert.-butyl-oxy-3,3-dimethyl-7-oxo-4-thia-2,6-diaza-6-bicyclo[3,2,0]heptyl)-α-(triphenylphosphoranylidene)-acetic acid tert.-butyl ester and 0.55 g of cyclopropyl glyoxal hydrate (prepared according to the process described by Smith and Regier, J.Am.Chem.Soc., Vol. 73, p. 4047 [1951] by oxidaton of toluene is heated for 30 minutes at 80°C and then allowed to stand at room temperature for 16 hours. The solvent and the greater portion of the excess of cyclopropyl-glyoxal are removed under reduced pressure and the residue is chromatographed on 40 g of acid-washed silica gel (column), elution being carried out with a 98:2-mixture of benzene and ethyl acetate. With the first 300 ml of this solvent mixture there is obtained the non-crystalline glassy isomer A (trans) of α-(2-carbo-tert.-butyloxy-3,3-dimethyl-7-oxo-4-thia-2,6-diaza-6-bicyclo [3,2,0]heptyl)-α-(cyclopropylcarbonyl-methylene)-acetic acid tert.-butyl ester of the formula

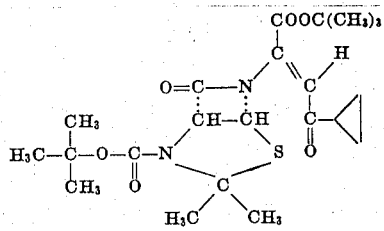

which in the thin-layer chromatogram (system: hexane/ethyl acetate 2:1) shows an Rf value of 0.56; ultraviolet absorption spectrum:in ethanol λ max 296 mμ; in ethanol/potassium hydroxide λ max 333 mμ; and on acidification of the ethanol/potassium hydroxide sample with hydrogen chloride λ max 333 mμ; infrared absorption spectrum (in methylene chloride): characteristic bands at 5.60μ, 5.80μ (shoulder), 5.84–5.91μ, 5.98μ (shoulder), and 6.25μ.

With a further 600 ml of the 98:2-mixture of benzene and ethyl acetate, a mixture of isomers A (trans) and B (cis) of α-(2-carbo-tert.-butyloxy-3,3-dimethyl-7-oxo-4-thia-2,6-diaza-6-bicyclo [3,2,0]heptyl)-α-(cyclopropylcarbonyl-methylene)-acetic acid tert.-butyl ester is washed out which is separated by means of preparative thin-layer chromatography (3 silica gel plates 20×20 ×0.15 cm), a 4:1-mixture of hexane and ethyl acetate being used as mobile phase. There is obtained a further quantity of the isomer A (trans) as well as the pure crystalline isomer B (cis) of α-(2-carbo-tert.-butyloxy-3,3-dimethyl-7-oxo-4-thia-2,6-diaza-6-bicyclo [2,3,0] heptyl)-α-(cyclopropylcarbonyl-methylene)-acetic acid tert.-butyl ester of the formula

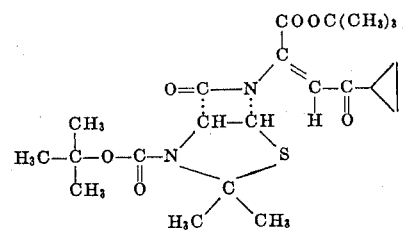

which after recrystallization from a 9:1-mixture of hexane and ether melts at 150°–151°C; thin-layer chromatography (system: hexane/ethyl acetate 2:1): Rf = 0.45; ultra-violet absorption spectrum: in ethanol λ max 291 mμ; in ethanol/potassium hydroxide λ max 333 mμ, and on acidification of the ethanol/potassium hydroxide sample with hydrogen chloride λ max 333 mμ; infrared absorption spectrum (in methylene chloride): characteristic bands at 5.60μ, 5.75–5.90μ, 5.98μ (shoulder), and 6.30μ.

EXAMPLE 35

A solution of 0.77 g of α-(2-carbo-tert.-butyl-oxy-3,3-dimethyl-7-oxo-4-thia-2,6-diaza-6-bicyclo[3,2,0]heptyl)-α-(triphosphoranylidene)-acetic acid tert.-butyl ester and 0.92 g of 3-chloropropyl-glyoxal hydrate in 23 ml of toluene is allowed to stand for 6 hours at 50°C. The solvent is removed under reduced pressure and the oily residue is purified by preparative thin layer chromatography (silica gel plates 100×20×0.15 cm; system: hexane/ethyl acetate 4:1). The least polar fraction (Rf = 0.38) represents the isomer A (trans) of α-(2-carbo-tert.-butyloxy-3,3-dimethyl-7-oxo-4-thia-2,6-bicyclo[3,2,0]heptyl)-α-(4-chlorobutyryl)-methylene]-acetic acid tert.-butyl ester of the formula

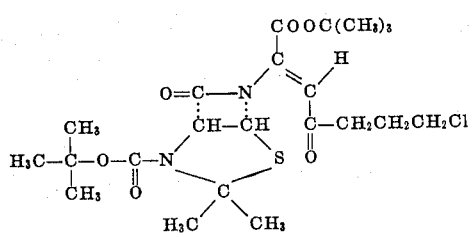

which is obtained as a colorless oil; thin layer chromatography (system: hexane/ethyl acetate 2:1); Rf = 0.48; ultra-violet absorption spectrum: λ max 295 mμ (in ethanol); infrared absorption spectrum (in methylene chloride): characteristic bands at 3.42μ, 5.62μ, 5.80–5.95μ, and 6.27μ.

The more polar fraction (Rf = 0.23) furnishes the isomer B (cis) of α-(2-carbo-tert.-butyloxy-3,3-dimethyl-7-oxo-4-thia-2,6-diaza-6-bicyclo[3,2,0]heptyl)-α-[(4-chloro-butyryl)-methylene]-acetic acid tert.-butyl ester of the formula

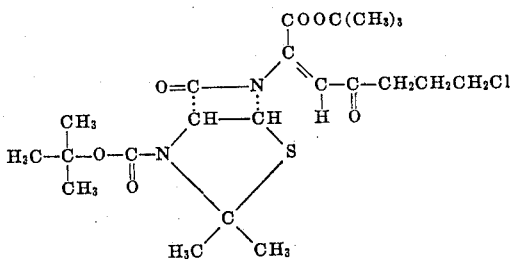

which is obtained as a colorless oil; thin layer chromatography (system: hexane/ethyl acetate 2:1): Rf = 0.42; ultra-violet absorption spectrum: $\lambda_{max}$ 295 m$\mu$ (in ethanol); infrared absorption spectrum (in methylene chloride): characteristic bands at 3.42$\mu$, 5.61$\mu$, 5.78–5.94$\mu$, and 6.31$\mu$.

A mixture of 0.29 g of the isomer B (cis) OF $\alpha$-(2-carbo-tert.-butyloxy-3,3-dimethyl-7-oxo-4-thia-2,6-diaza-6-bicyclo[3,2,0]heptyl)-$\alpha$-[(4-chlorobutyryl)-methylene]-acetic acid tert.-butyl ester in 130 ml of benzene is irradiated with a high pressure mercury vapor lamp in a pyrex glas mantle at room temperature for 3 hours and is then evaporated under reduced pressure. The crude mixture of the two isomers A and B of $\alpha$-(2-carbo-tert.-butyloxy-3,3-dimethyl-7-oxo-4-thia-2,6-diaza-6-bicyclo[3,2,0]heptyl)-$\alpha$-[(4-chlorobutyryl)-methylene]-acetic acid tert.-butyl ester is separated by thin layer chromatography as described above and an additional amount of the desired isomer A (trans) can thus be obtained.

The 3-chloropropyl-glyoxal used as the starting material in the above procedure may be prepared as follows: A solution of 10 g of 4-chlorobutyryl chloride in 150 ml of dry ether is slowly added to a solution of 12.3 g of diazomethane in 500 ml of ether while stirring and cooling to 0° to 5° in an ice-methanol bath. After another 5 minutes at 0° to 5°, the solution, containing the 3-chloropropyl diazomethyl ketone, is concentrated under reduced pressure to a volume of 150 ml and immediately treated with a solution of 22.8 g of triphenyl-phosphine in 200 ml of ether. The 1-(3-chloropropyl)-3-(triphenylphosphoranylidene-hydrazono)-acetone crystallizes, m.p. 103°–104°; ultra-violet absorption spectrum: $\mu_{max}$ 320 m$\mu$ and 228 m$\mu$ (in ethanol); infrared absorption spectrum (in methylene chloride); characteristic band at 6.10$\mu$ and 6.64$\mu$. A further amount of the desired product can be isolated from the mother liquor.

A mixture of 6 g of 1-(3-chloropropyl)-3-(triphenylphosphoranylidene-hydrazono)-acetone and 3.1 g of sodium nitrate in 55 ml tetrahydrofuran and 30 ml of water is treated while stirring with 22 ml of 2N hydrochloric acid, which is added slowly and while cooling to 13°–15° in an ice-water bath. After another 15 minutes at room temperature, the mixture is extracted three times with 150 ml portions of ether. The combined organic extracts are washed five times with a standard aqueous sodium chloride solution, dried over sodium sulfate and evaporated under reduced pressure. The oily yellow residue is chromatographed on 100 ml of acid-washed silica gel (column); the pure 3-chloroethyl-glyoxal hydrate is eluted with a 95:5-mixture of benzene and ethyl acetate, infrared absorption spectrum (in methylene chloride): characteristic bands at 2.90–4.0$\mu$ (broad), 3.45$\mu$, and 5.81$\mu$.

EXAMPLE 36

A solution of 0.3784 g of the isomer A (trans) of the $\alpha$-(2-carbo-tert.-butyloxy-3,3-dimethyl-7-oxo-4-thia-2,6-diaza-6-bicyclo[3,2,0]heptyl)-$\alpha$-[(4-tert.-butyl-phenyl)-acetylmethylene]-acetic acid tert.-butyl ester in 3 ml pre-cooled trifluoroacetic acid is allowed to stand at −20° for a period of 20 hours. The trifluoroacetic acid is then distilled off under reduced pressure and at room temperature, and the residue, containing the 7-amino-4-(4-tert.-butyl-benzylidene)-8-oxo-5-thia-1-azabicyclo[4,2,0]oct-2-ene-2-carboxylic acid (configuration of 7-amino-cephalosporanic acid) or 7-amino-2-(4-tert.-butyl-benzylidene)-$\Delta^3$-cephem-4-carboxylic acid, is treated with 4 ml of a solution of the mixed anhydride of cyanoacetic and trichloracetic acid in methylene chloride (preparation see Example 12), while keeping the temperature at −10°. The addition is followed by 2 ml of a solution of triethylamine and triethylammonium acetate in methylene chloride (preparation see Example 12), and the resulting reaction mixture is stirred without cooling for 2½ hours, then treated with 40 ml of ethyl acetate. The mixture is washed with dilute hydrochloric acid and a saturated aqueous sodium chloride solution; the organic layer is dried over sodium sulfate and evaporated. The residue is chromatographed on a column of 10 g of acid-washed silicagel; with a 95:5-mixture of benzene and acetone trichloroacetic acid, cyano-acetic acid and some neutral by-product are washed out. With a 2:1-mixture of benzene and ethyl acetate the crude 7-N-cyanoacetylamino-4-(4-tert.-butyl-benzylidene)-8-oxo-5-thia-1-azabicyclo[4,2,0]oct-2-ene-2-carboxylic acid (configuration of 7-amino-cephalosporanic acid) or 7-N-cyanoacetylamino-2-(4-tert.-butyl-benzylidene)-$\Delta^3$-cephem-4-carboxylic acid of the formula

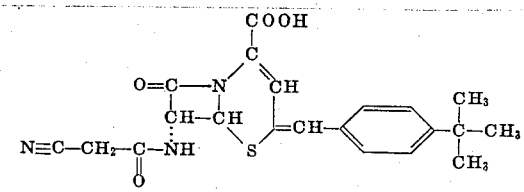

is eluted as an amorphous material, ultraviolet absorption spectrum: $\lambda_{max}$ 361 m$\mu$ (in ethanol), $\lambda_{max}$ 352 m$\mu$ (in ethanol/potassium hydroxide), and $\lambda_{max}$ 363 m$\mu$ (in ethanol/hydrogen chloride); infrared absorption spectrum (in methylene chloride): characteristic bands at 2.90–4.35$\mu\mu$, 5.50–5.68$\mu$, 5.75–5.90$\mu$, 6.05$\mu$ (shoulder), 6.25$\mu$, and 6.40–6.65$\mu$.

A solution of the resulting material in 2ml of acetone is treated with 1 ml of a 10 percent solution of the sodium salt of $\alpha$-ethyl-hexanoic acid in acetone and with ether. A dark colored material is discarded and the beige-colored sodium salt of 7-N-cyanoacetylamino-4-(4-tert.-butyl-benzylidene)-8-oxo-5-thia-1-azabicyclo[4,2,0]oct-2-ene-2-carboxylic acid (configuration of 7-amino-cephalosporanic acid) or 7-N-cyanoacetylamino-2-(4-tert.-butyl-benzylidene)-$\Delta^3$-cephem-4-car-boxylic acid is filtered off, m.p. >240°; ultraviolet absorption spectrum: $\lambda_{max}$ 352 m$\mu$ (in ethanol), and $\lambda_{max}$ 363 m$\mu$ (in ethanol/hydrogen chloride); infrared absorption spectrum (potassium bromide): characteristic bands at 2.80–4.0$\mu$, 3.40$\mu$, 4.52μ, 5.65–5.70μ, 5.90μ (shoulder), and 6.03–6.55μ.

The α-(2-carbo-tert.-butyloxy-3,3-dimethyl-7-oxo-4-thia-2,6-diaza-6-bicyclo[3,2,0]heptyl)-α-[(4-tert.-butyl-phenyl)acetylemethylene]-acetic acid tert.-butyl ester used as starting material may be prepared as follows: A solution of 1.5 g of α-(2-carbo-tert.-butyloxy-3,3-dimethyl-7-oxo-4-thia-2,6-diaza-6-bicyclo[3,2,0]heptyl)-α-(triphenylphosphoranylidene)-acetic acid tert.-butylester and 1.5 g of 4-tert.-butyl-benzyl-glyoxal hydrate in 1.5 ml of toluene is heated for 90 minutes at 80° under a nitrogen atmosphere. The solvent is then distilled off under reduced pressure and the residue is chromatographed (preparative thin-layer chromatogram; 3 silicagel plates 100×20×0.15 cm), using a 4:1-mixture of hexane and ethyl acetate as moving phase. One thus obtains the isomer A (trans) of the α-(2-carbo-tert.3butyloxy-3,3-dimethyl-7-oxo-4-thia-2,6-diaza-6-bicyclo[3,2,0]heptyl)-α-[(4-tert.-butyl-phenyl)-acetylmethylene]-acetic acid tert.-butyl ester of the formula

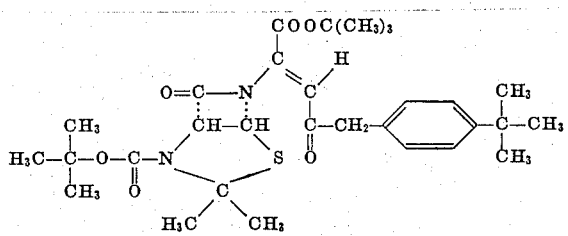

as an amorphous foam, thin layer chromatogram (silicagel; system hexane/ethyl acetate 4:1): Rf = 0.58; ultraviolet absorption spectrum: $\lambda_{max}$ 298 mμ (in ethanol), $\lambda_{max}$ 338 mμ (in ethanol/potassium hydroxide), and $\lambda_{max}$ 338 mμ (upon adding hydrogen chloride to the previous sample); infrared absorption spectrum (in methylene chloride): characteristic bands at 3.40μ, 5.62μ, 5.78μ (shoulder), 5.82–5.92μ, and 6.27μ; and the isomer B (cis) of the α-(2-carbo-tert.-butyloxy-3,3-dimethyl-7-oxo-4-thia-2,6-diaza-6-bicyclo[3,2,0]heptyl)-α-[(4-tert.-butyl-phenyl)-acetylmethylene]-acetic acid tert.-butyl ester of the formula

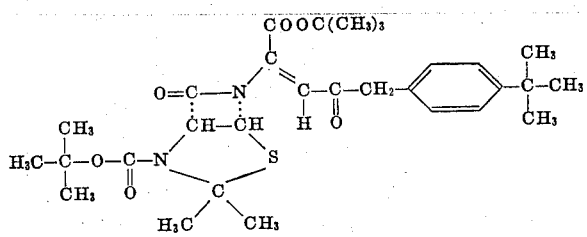

which melts at 153° after recrystallization from hexane; $[\alpha]_D^{20} - 328° \pm 1°$ (c = 0.888 in chloroform); thin layer chromatogram (silicagel; system hexane/ethyl acetate 4:1): Rf = 0.44; ultraviolet absorption spectrum: $\lambda_{max}$ 295 mμ (ε = 18.300) (in ethanol), $\lambda_{max}$ 338 mμ (in ethanol/potassium hydroxide), and $\lambda_{max}$ 338 mμ (upon adding hydrogen chloride to the previous sample); infrared absorption spectrum (in methylene chloride): characteristic bands at 3.40μ, 5.60μ, 5.72μ (shoulder), 5.80–5.92μ, and 6.28μ.

The 4-tert.-butyl-benzyl-glyoxal hydrate used in the above preparation of the starting material may be manufactured as follows: A solution of 10.6 g of 4-tert.butyl-phenylacetic acid chloride (prepared by treating a mixture of 10 g of 4-tert.-butyl-phenylacetic acid with 60 ml of thionyl-chloride at 60° for 3 hours, removing the excess of thionyl chloride under reduced pressure and taking a mixture of the residue in benzene several times to dryness in order to remove traces of thionyl chloride) in 100 ml of dry ether is slowly added to a solution of 8.3 g of diazomethane in 300 ml of ether. After standing for 10 minutes at −5°, the excess of diazomethane and ether is distilled off under reduced pressure and at room temperature. The yellow oily residue represents the 4-tert.-butyl-benzyl-diazomethyl-ketone; infrared absorption spectrum (in methylene chloride): characteristic bands at 3.40μ, 3.50μ (shoulder), 4.72μ, 6.10μ, and 7.38μ; is used without further purification.

A solution of 10.9 g of 4-tert.-butyl-benzyl-diazomethyl-ketone in 200 ml of dry ether and a mixture of 13.2 g of triphenyl-phosphine in 200 ml of dry ether are combined and stirred at room temperature for about 30 minutes. The 1-(4-tert.-butyl-phenyl)-3-(triphenylphosphoranylidene)-acetone precipitates, m.p. 129°–130° after recrystallization from hexane; ultraviolet absorption spectrum (in ethanol): $\lambda_{max}$ 314 mμ (ε = 7,900) and $\lambda_{max}$ 258 mμ (ε = 16,600); infrared absorption spectrum (in methylene chloride): characteristic bands at 3.40μ, 4.72μ, 6.00μ (shoulder), 6.07μ, and 6.60μ. A further amount of the product is obtained upon concentrating the mother liquor.

A solution of 9.6 g of 1-(4-tert.butyl-phenyl)-3-(triphenylphosphoranylidene)-acetone in 60 ml of tetrahydrofuran and 44 ml of water is treated with 4.2 g of sodium nitrite; the suspension is stirred at 10°–13°, while 44ml of 2-n. hydrochloric acid is added dropwise. After another 10 minutes at 10°, the organic layer is separated and the aqueous solution is extracted with methylene chloride. The organic solutions are combined and evaporated; the residue is crystallized from ether, and the product from the mother liquor is chromatographed on 80 g of acid-washed silicagel. With benzene and a 96:4-mixture of benzene and ethyl acetate the desired non-crystalline 4-tert.butyl-benzyl-glyoxal hydrate is eluted; ultraviolet absorption spectrum: $\lambda_{max}$ 250–275 mμ (in ethanol), $\lambda_{max}$ 364 mμ (in ethanol/potassium hydroxide), and $\lambda_{max}$ 322 mμ (in ethanol/hydrogen chloride); infrared absorption spectrum (in methylene chloride): characteristic bands at 2.85–4.20μμ, 5.76μ, 6.60μ, and 7.30μ; thin layer chromatogram (silicagel; system benzene/ethyl acetate 1:1): Rf ≈0.57 (extended spot); and is used without further purification.

We claim:

1. A member selected from the group consisting of 7-amino-8-oxo-5-thia-1-azabicyclo[4,2,0]oct-2-ene2-carboxylic acid compounds of the formula

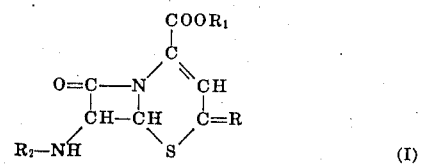

wherein $R_1$ is a member selected from the group consisting of hydrogen, lower alkyl and lower alkyl having in 2-position one or more than one halogen atom, $R_2$ is a member selected from the group consisting of hydrogen, phenylacetyl, cyanoacetyl, phenylglycyl, phenyloxyacetyl, thienylacetyl, α-amino-thienylacetyl, α-amino-cyclohexylcarbonyl, N-2-chloroethyl-carbamyl, and carbo-lower alkoxy, and R is methylene substituted by a member selected from the group consisting of one lower alkyl, two lower alkyls, cycloalkyl or three to eight ring carbon atoms, phenyl, phenyl-lower alkyl and phenyl and phenyl-lower alkyl substituted in the ring by a member selected from the group consisting of lower alkyl, lower alkoxy, nitro and halogeno, and alkali metal, alkaline-earth metal or ammonium salts of the carboxylic acids.

2. A compound as claimed in claim 1 and being the 7-amino-4-benzylidene-8-oxo-5-thia-1-azabicyclo[4,2,0]oct-2-ene-2-carboxylic acid with the configuration of 7-amino-cephalosporanic acid.

3. A compound as claimed in claim 1 and being the 7-amino-4-isopropylidene-8-oxo-5-thia-1-azabicyclo[4,2,0]oct-2-ene-carboxylic acid with the configuration of 7-amino-cephalosporanic acid.

4. A compound as claimed in claim 1 and being the 7-amino-4-(4-nitro-benzylidene)-8-oxo-5-thia-1-azabicyclo[4,2,0]oct-2-ene-carboxylic acid with the confiiguration of 7-amino-cephalosporanic acid.

5. A compound as claimed in claim 1 and being the 7-amino-4-(4-methoxy-benzylidene)-8-oxo-5-thia-1-azabicyclo[4,2,0oct-2-ene-carboxylic acid with the configuration of 7-amino-cephalosporanic acid.

6. A compound as claimed in claim 1 and being the 7-amino-4-(4-chloro-benzylidene)-8-oxo-5-thia-1-azabicyc-lo[4,2,0]oct-2-ene-2-carboxylic acid with the configuration of 7-amino-cephalosporanic acid.

7. A compound as claimed in claim 1 and being the 7-amino-4-cyclohexylmethylene-8-oxo-5-thia-1-azabicyclo[4,2,0]oct-2-ene-2-carboxylic acid with the configuration of 7-amino-cephalosporanic acid.

8. A compound as claimed in claim 1 and being the 4-benzylidene-7-N-cyanoacetylamino-8-oxo-5-thia-1-azabicyc-lo[4,2,0]oct-2-ene-2-carboxylic acid with the configuration of 7-amino-cephalosporanic acid.

9. A compound as claimed in claim 1 and being the 7-N-cyanoacetyl-amino-4-(4-nitro-benzylidene)-8-oxo-5-thia-1-azabicyclo[4,2,0]oct-2-ene-2-carboxylic acid with the configuration of 7-amino-cephalosporanic acid.

10. A compound as claimed in claim 1 and being the 4-(4-chloro-benzylidene)-7-N-cyanoacetyl-amino-8-oxo-5-thia-1-azabicyclo[4,2,0]oct-2-ene-2-carboxylic acid with the configuration of 7-amino-cephalosporanic acid.

11. A compound as claimed in claim 1 and being the 7-amino-8-oxo-4-(2-phenyl-1,1-ethylidene)-5-thia-1-azabicyclo[4,2,0]oct-2-ene-2-carboxylic acid with the configuration of 7-amino-cephalosporanic acid.

12. A compound as claimed in claim 1 and being the 4-benzylidene-7-N-(D-phenyl-glycyl)-amino-8-oxo-5-thia-1-azabicyclo[4,2,0]oct-2-ene-2-carboxylic acid with the configuration of 7-amino-cephalosporanic acid.

13. A compound as claimed in claim 1 and being the 7-amino-4-(3-chloro-1,1-propylidene)-8-oxo-5-thia-1-azabicyclo[4,2,0]oct-2-ene-2-carboxylic acid with the configuration of 7-amino-cephalosporanic acid.

14. A member selected from the group consisting of a compound of the formula

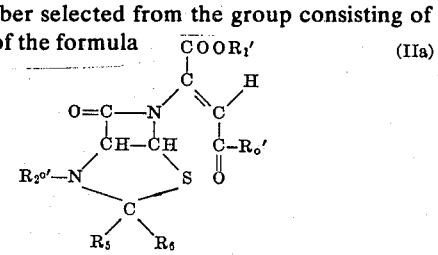

(IIa)

wherein $R_1'$ is a member selected from the group consisting of hydrogen, lower alkyl, and lower alkyl having in 2-position one or more than one halogen atom, $R_2^{o'}$ is a member selected from the group consisting of hydrogen and an acyl group $Ac^o$ which is an easily removable carbo-lower alkoxy group, each of $R_5$ and $R_6$ stands for lower alkyl, and $R_o'$ stands for methylene substituted for methylene substituted by a member selected from the group consisting of one lower alkyl, two lower alkyls, cycloalkyl of three to eight ring carbon atoms, phenyl, phenyl-lower alkyl and phenyl and phenyl-lower alkyl substituted in the ring by a member selected from the group consisting of lower alkyl, lower alkoxy, nitro and halogeno, and alkali metal, alkaline-earth metal or ammonium salts of the carboxylic acids.

15. A compound as claimed in claim 14 and being the isomer A (trans) of α-(2-carbo-tert.-butyloxy-3,3-dimethyl-7-oxo-4-thia-2,6-diaza-6-bicyclo[3,2,0]heptyl)-α-(phenylacetylmethylene)-acetic acid tert.-butyl ester melting at about 109°-110°C.

16. A compound as claimed in claim 14 and being the isomer A (trans) of α-(2-carbo-tert.-butyloxy-3,3-dimethyl-7-oxo-4-thia-2,6-diaza-6-bicyclo[3,2,0]heptyl)-α-(isobutyrylmethylene)-acetic acid tert.-butyl ester melting at about 133°-134°C.

17. A compound as claimed in claim 14 and being the non-crystalline isomer A (trans) of α-(2-carbo-tert.-butyloxy-3,3-dimethyl-7-oxo-4-thia-2,6-diaza-6-bicyclo[3,2,0]-heptyl)-α-[(4-nitrophenyl-acetyl)-methylene]-acetic acid tert.-butyl ester.

18. A compound as claimed in claim 14 and being the isomer A (trans) of α-(2-carbo-tert.-butyloxy-3,3-dimethyl-7-oxo-4-thia-2,6-diaza-6-bicyclo[3,2,0]heptyl)-α-[(4-methoxyphenyl-acetyl)-methylene]-acetic acid tert.-butyl ester melting at about 105°-107°C.

19. A compound as claimed in claim 14 and being the non-crystalline isomer A (trans) of α-(2-carbo-tert.-butyloxy-3,3-dimethyl-7-oxo-4-thia-2,6-diaza-6-bicyclo[3,2,0]-heptyl)-α-[(4-chlorophenyl-acetyl)-methylene]-acetic acid tert.-butyl ester.

20. A compound as claimed in claim 14 and being the non-crystalline isomer A (trans) of α-(2-carbo-tert.-butyloxy-3,3-dimethyl-7-oxo-4-thia-2,6-diaza-6-bicyclo[3,2,0]heptyl)-α-(cyclohexylacetyl-methylene)-acetic acid tert.-butyl ester.

21. A compound as claimed in claim 14 and being the isomer A (trans) of α-(2-carbo-tert.-butyloxy-3,3-dimethyl-7-oxo-4-thia-2,6-diaza-6-bicyclo[3,2,0]heptyl)-α-[(3-phenylpropionyl)-methylene]-acetic acid tert.-butyl ester.

22. A compound as claimed in claim 14 and being the non-crystalline isomer A (trans) of α-(2-carbo-tert.-butyloxy-3,3-dimethyl-7-oxo-4-thia-2,6-diaza-6-bicyclo[3,2,0]-heptyl)-α-(cyclopropylcarbonyl-methylene)-acetic acid tert.-butyl ester.

23. A compound as claimed in claim 14 and being the non-crystalline isomer A (trans) of α-(2-carbo-tert.-butyloxy-3,3-dimethyl-7-oxo-4-thia-2,6-diaza-6-bicyclo[3,2,0]heptyl)-α-[(4-chlorobutyryl)-methylene]-acetic acid tert.-butyl ester.

24. Process for the manufacture of a member selected from the group consisting of 7-amino-8-oxo-5-thia-1-azabicyclo-[4,2,0]oct-2-ene-2-carboxylic acid compounds of the formula

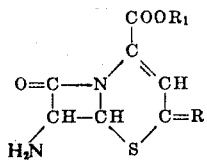

(I)

wherein $R_1$ is a member selected from the group consisting of hydrogen, lower alkyl, and lower alkyl having in 2-position one or more than one halogen atom, and R is methylene substituted by a member selected from the group consisting of one lower alkyl, two lower alkyls, cycloalkyl of three to eight ring carbon atoms, phenyl, phenyl-lower alkyl and phenyl and phenyl-lower alkyl substituted in the ring by a member selected from the group consisting of lower alkyl, lower alkoxy, nitro and halogeno, and alkali metal, alkaline-earth metal or ammonium salts of the carboxylic acids, wherein a compound of the formula

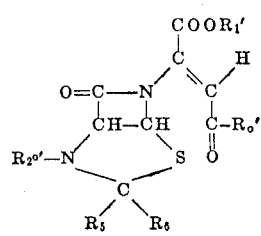

(IIa)

in which $R_1$ has the meaning given above, $R_2^\circ$ is a member selected from the group consisting of hydrogen and the acyl group $Ac^\circ$ which is an easily removable carbo-lower alkoxy group, each of $R_5$ and $R_6$ stands for lower alkyl, and $R_o'$ stands for methylene substituted by a member selected from the group consisting of one lower alkyl, two lower alkyls, cycloalkyl of three to eight ring carbon atoms, phenyl, phenyl-lower alkyl and phenyl and phenyl-lower alkyl substituted in the ring by a member selected from the group consisting of lower alkyl, lower alkoxy, nitro and halogeno, is ring-closed by the treatment with an α-halogenoacetic acid or an aryl-sulfonic acid.

25. A process as claimed in claim 24, wherein the ring-closure is carried out with trifluoroacetic acid.

* * * * *